(12) United States Patent
Hwang

(10) Patent No.: US 12,478,602 B2
(45) Date of Patent: Nov. 25, 2025

(54) METHOD FOR TREATING A DISORDER

(71) Applicant: ASTROGEN, INC., Daegu (KR)

(72) Inventor: Su-Kyeong Hwang, Daegu (KR)

(73) Assignee: ASTROGEN, INC., Daegu (KR)

( * ) Notice: Subject to any disclaimer, the term of this patent is extended or adjusted under 35 U.S.C. 154(b) by 0 days.

(21) Appl. No.: 19/021,386

(22) Filed: Jan. 15, 2025

(65) Prior Publication Data
US 2025/0152538 A1 May 15, 2025

Related U.S. Application Data

(63) Continuation of application No. PCT/KR2023/020475, filed on Dec. 12, 2023.

(30) Foreign Application Priority Data

Jul. 7, 2023 (KR) .................. 10-2023-0088186

(51) Int. Cl.
- *A61K 31/198* (2006.01)
- *A61K 9/00* (2006.01)
- *A61P 25/00* (2006.01)

(52) U.S. Cl.
CPC .......... *A61K 31/198* (2013.01); *A61K 9/0053* (2013.01); *A61K 9/0095* (2013.01); *A61P 25/00* (2018.01)

(58) Field of Classification Search
CPC .................................................. A61K 31/198
See application file for complete search history.

(56) References Cited

U.S. PATENT DOCUMENTS

2013/0156846 A1* 6/2013 Rodgers .................. A61P 11/00
  514/561
2019/0374493 A1* 12/2019 Cox ........................ A61P 25/28

FOREIGN PATENT DOCUMENTS

| JP | 5-339148 A | 12/1993 |
| JP | 2014-534263 A | 12/2014 |
| KR | 10-2019-0044045 A | 4/2019 |
| KR | 10-2022118 B1 | 9/2019 |
| KR | 10-2022-0131186 A | 9/2022 |

OTHER PUBLICATIONS

International Search Report issued Apr. 1, 2024 in International Application No. PCT/KR2023/020475.

Written Opinion of the International Searching Authority issued Apr. 1, 2024 in International Application No. PCT/KR2023/020475.

* cited by examiner

*Primary Examiner* — Rei Tsang Shiao
(74) *Attorney, Agent, or Firm* — Sughrue Mion, PLLC

(57) ABSTRACT

A method of treating an individual having a disease selected from communication disorder, abnormal motor ability, cognitive disorder, mental disorder, sensory disturbance, autism spectrum disorder, and pervasive developmental disorder is disclosed. The method includes administering L-serine or a pharmaceutically acceptable salt thereof or a pharmaceutical composition containing L-serine or a pharmaceutically acceptable salt thereof to an individual having the disease.

18 Claims, 18 Drawing Sheets

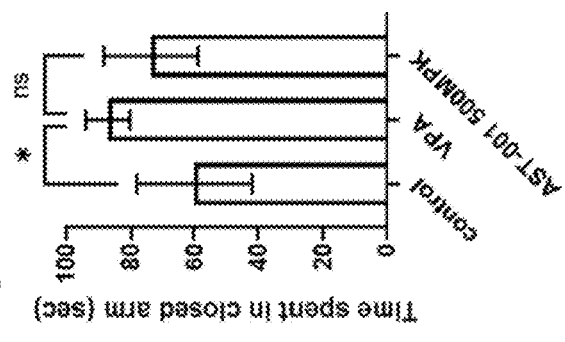
FIG. 2B
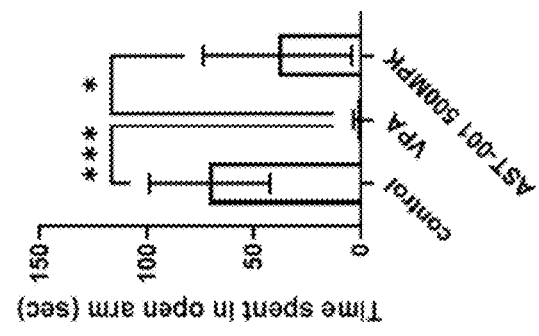
FIG. 2D
FIG. 2C
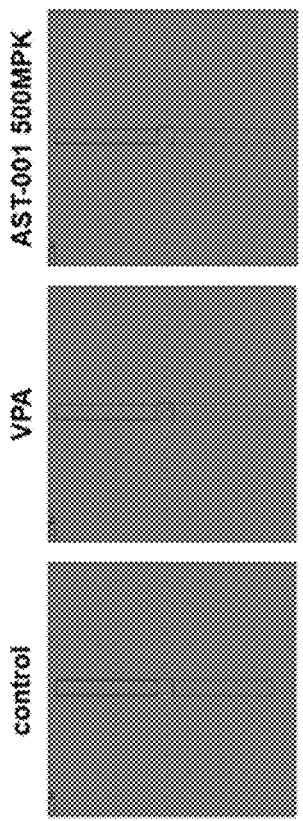
FIG. 2A
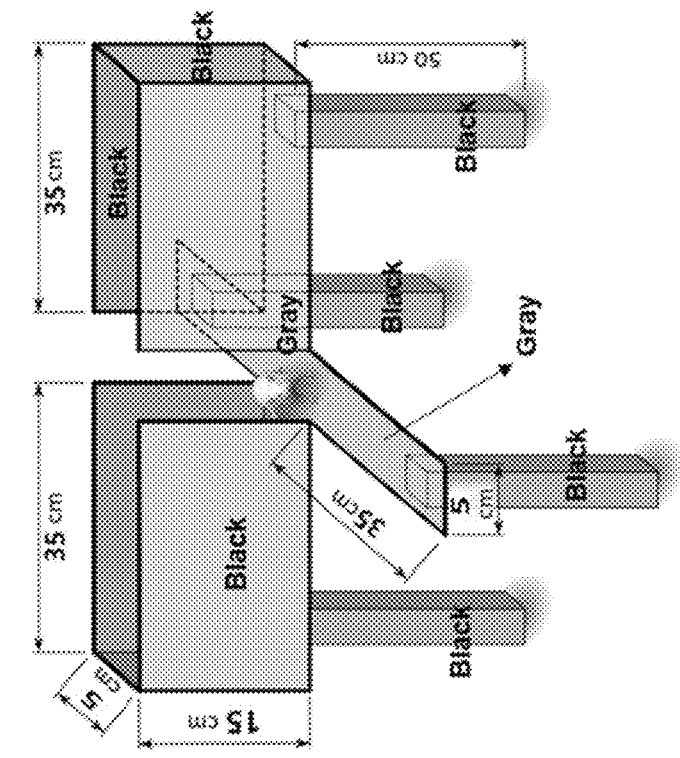

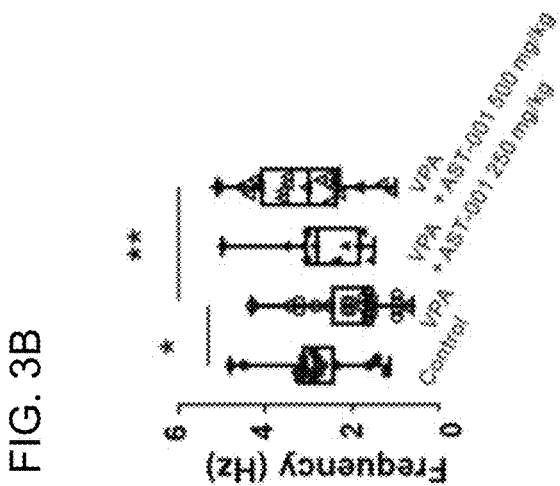
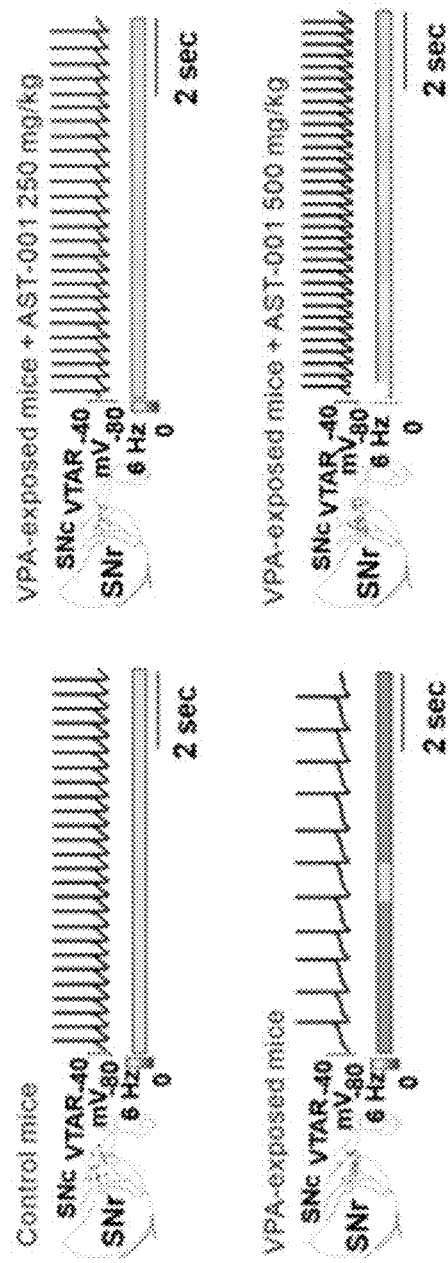
FIG. 3A
FIG. 3B

FIG.12

| Administration group | N | Baseline | 12 weeks | Amount of change at 12 weeks with respect to baseline | Model-adjusted Treatment difference [1]* |
|---|---|---|---|---|---|
| Placebo | 49 | 50.22±10.33 | 51.93±10.65 | 1.70±3.39 | |
| Low dose | 50 | 52.28±11.59 | 54.65±12.14 | 2.37±3.78 | 0.71±0.71 |
| High dose | 46 | 51.53±9.89 | 54.80±11.66 | 3.27±3.78 | 1.66±0.73 |

| Administration group | N | 24 weeks | Amount of change at 24 weeks with respect to baseline | Model-adjusted Treatment difference [2]* |
|---|---|---|---|---|
| High dose and short term | 49 | 54.12±12.04 | 3.90±4.94 | 1.41±1.05 |
| Low dose and long term | 50 | 56.21±13.14 | 3.93±4.76 | 1.50±1.01 |
| High dose and long term | 46 | 56.66±12.57 | 5.13±5.29 | |

| Administration group | N | 36 weeks | Amount of change at 36 weeks with respect to baseline | Model-adjusted Treatment difference [2]* |
|---|---|---|---|---|
| High dose and short term | 46 | 54.76±12.43 | 3.91±5.55 | 1.24±1.18 |
| Low dose and long term | 45 | 56.39±13.56 | 3.66±5.20 | 1.64±1.16 |
| High dose and long term | 44 | 56.35±13.24 | 4.78±6.00 | |

FIG.14

| Administration group | N | Baseline | 12 weeks | Amount of change at 12 weeks with respect to baseline | Model-adjusted Treatment difference [1] |
|---|---|---|---|---|---|
| Placebo | 43 | 47.91±10.70 | 49.30±11.19 | 1.40±2.95 | |
| Low dose | 48 | 50.77±11.92 | 53.63±13.43 | 2.85±4.04 | 1.35±0.75 |
| High dose | 43 | 49.07±9.08 | 51.98±10.83 | 2.91±3.44 | 1.59±0.69 |

| Administration group | N | Baseline | 24 weeks | Amount of change at 24 weeks with respect to baseline |
|---|---|---|---|---|
| High dose and short term | 44 | 48.25±10.64 | 52.27±12.62 | 4.02±4.46 |
| Low dose and long term | 43 | 51.72±12.09 | 56.30±14.96 | 4.58±5.58 |
| High dose and long term | 37 | 49.89±9.97 | 55.41±13.30 | 5.51±5.64 |

| Administration group | N | Baseline | 36 weeks | Amount of change at 36 weeks with respect to baseline |
|---|---|---|---|---|
| High dose and short term | 36 | 49.31±11.39 | 53.81±14.60 | 4.50±5.61 |
| Low dose and long term | 40 | 51.50±11.21 | 56.43±14.33 | 4.93±5.54 |
| High dose and long term | 38 | 50.13±9.63 | 55.66±13.98 | 5.53±6.79 |

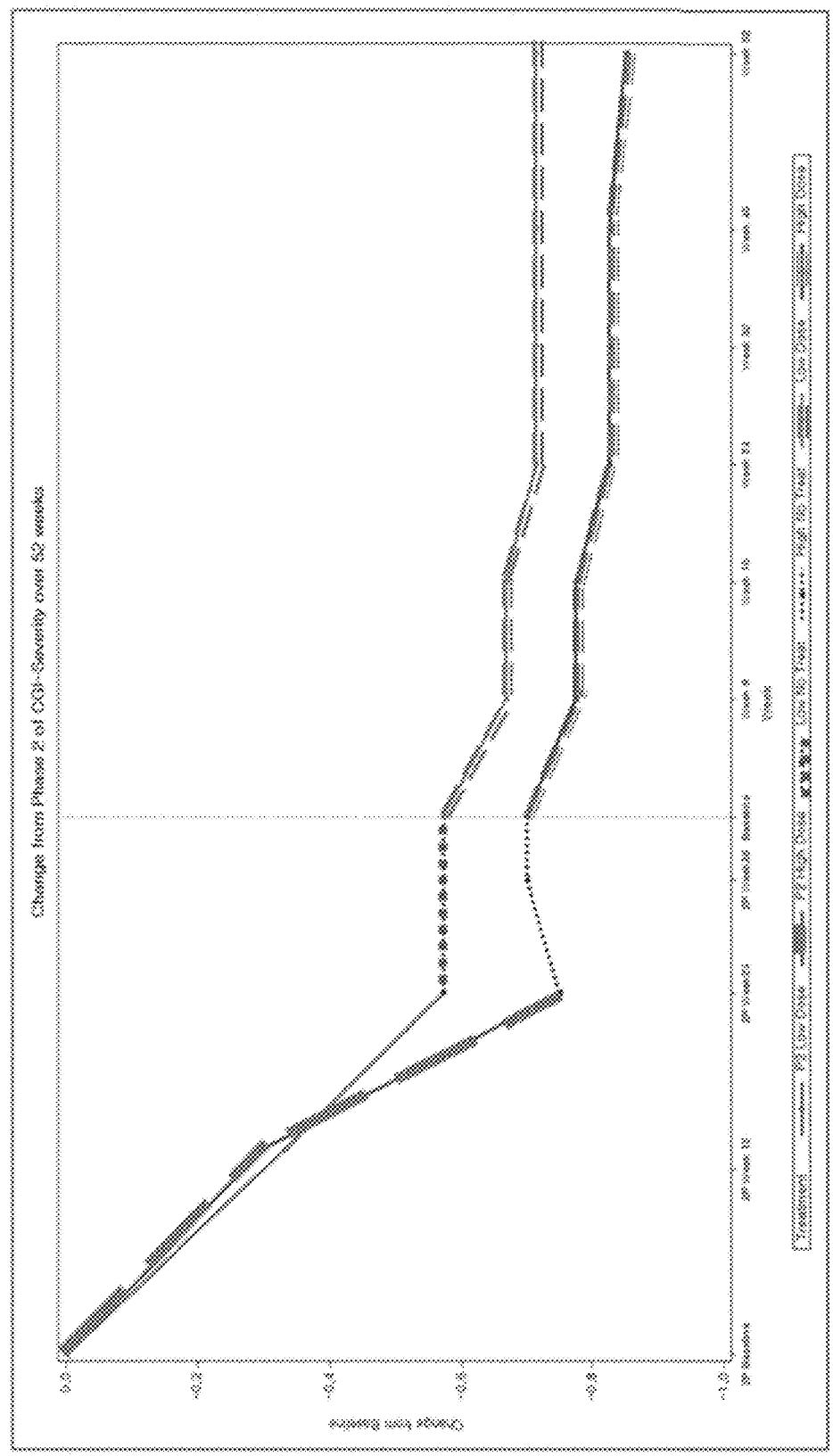
FIG.17

FIG.18

| Simulation Scenario (Weight based dosage 4) | | | | | | | | |
|---|---|---|---|---|---|---|---|---|
| | | Treatment | | | | Placebo | | |
| Weight range | Dose | AK-VABS-II-ABC at 12 week [a] | | | Target attainment (%)[b] | AK-VABS-II-ABC at 12 week [a] | | Target attainment (%)[b] |
| | | 5% | 50% | 95% | | 5% | 50% | 95% | |
| 10 ~ 13 kg | 2g BID | -0.8 | 1.67 | 4.01 | 40.5 | -1.75 | 0.92 | 3.34 | 19.5 |
| 14 ~ 20 kg | 4g BID | -0.71 | 2.06 | 7.65 | 51.5 | -1.06 | 1.15 | 3.3 | 29 |
| 21 ~ 34 kg | 6g BID | -0.91 | 2.13 | 13.05 | 54 | -1.69 | 1.02 | 3.74 | 29 |
| 35 ~ 49 kg | 10g BID | -0.07 | 2.77 | 20.99 | 65 | -1.56 | 0.98 | 3.78 | 29.5 |
| 50 kg ~ | 14g BID | -0.65 | 3.74 | 24.81 | 73 | -1.57 | 0.96 | 3.65 | 27 |

| Simulation Scenario (Phase 2 trial dosage) | | | | | | | | |
|---|---|---|---|---|---|---|---|---|
| | | Treatment | | | | Placebo | | |
| Weight range | Dose | AK-VABS-II-ABC at 12 week [a] | | | Target attainment (%)[b] | AK-VABS-II-ABC at 12 week [a] | | Target attainment (%)[b] |
| | | 5% | 50% | 95% | | 5% | 50% | 95% | |
| 10 ~ 14 kg | 2g BID | -0.8 | 1.67 | 4.01 | 40.5 | -1.75 | 0.92 | 3.34 | 19.5 |
| 15 ~ 24 kg | 4g BID | -0.7 | 2.11 | 7.72 | 53 | -1.06 | 1.15 | 3.3 | 29 |
| 25 ~ 37 kg | 7g BID | -0.9 | 2.32 | 15.4 | 56 | -1.69 | 1.02 | 3.74 | 29 |
| 38 ~ 51 kg | 10g BID | -0.068 | 2.76 | 20.99 | 65 | -1.56 | 0.98 | 3.78 | 29.5 |
| 52 kg ~ | 14g BID | -0.67 | 3.73 | 24.76 | 73 | -1.57 | 0.96 | 3.65 | 27 |

Target attainment: a ratio of pediatric patients in which the amount of score change in the K-VABS-II-ABC at 12 weeks is increased by 2 points or more with respect to 0 weak (base line)

METHOD FOR TREATING A DISORDER

CROSS-REFERENCE TO RELATED APPLICATIONS

This application is a Continuation of PCT International Application No. PCT/KR2023/020475 filed on Dec. 12, 2023, which claims priority under 35 U.S.C. § 119(a) to Korean Patent Application No. 10-2023-0088186 filed on Jul. 7, 2023. The above applications are hereby expressly incorporated by reference, in their entirety, into the present application.

TECHNICAL FIELD

The present invention relates to a method for administering L-serine to an individual having a disease such as communication disorder, abnormal motor ability, cognitive disorder, mental disorder, sensory disturbance, autism spectrum disorder, and pervasive developmental disorder, thereby improving or treating the disease or one or more of symptoms of the disease, and a pharmaceutical composition for improving or treating the disease or one or more of symptoms of the disease, as well as uses of these for manufacturing a medicament.

BACKGROUND ART

In the process of growth of a child, after birth through the infant, child, and adolescent stages, the development of excitatory synapses/inhibitory synapses is achieved in a balanced manner at the critical stage of rebalancing the cerebral cortex signaling system. The balanced development of synapses is achieved through synaptic pruning by which unused synapses are removed during the critical stage, and the efficiency of frequently used synapses is increased. The initiation time and end time of synaptic pruning vary between brain regions. For example, synaptic pruning in the visual cortex begins at 8 months after birth and ends at age 6, and synaptic pruning in the prefrontal cortex begins at age 2 and ends at age 11.

On the other hand, in a case where synaptic pruning is not achieved properly at the critical stage, neurodevelopmental disorders, such as communication disorder, abnormal motor ability, cognitive disorder, mental disorder, sensory disturbance, autism spectrum disorder, and pervasive developmental disorder, may occur. Disorders/deficiencies in reciprocal social interaction, communication disorder, and/or repetitive behavior, and the like are known as symptoms of neurodevelopmental disorders. In addition, for the treatment or amelioration of neurodevelopmental disorders, early intervention should be made before the end of the critical stage.

However, the causes and symptoms of the above-described neurodevelopmental disorder are very diverse, and thus it is difficult to find a target substance or therapeutic mechanism. In addition, although risperidone and aripiprazole have been used to a limited extent in a patient with severe aggression and severe anxiety, there is a problem in that cognitive development, social development, and language development cannot be effectively improved. In consideration of this, research on drugs/mechanisms for treating neurodevelopmental disorders is being actively carried out. For example, research has been carried out on drugs such as cholinergic and glutamic substances, oxytocin administered intranasally, and a vasopressin 1a receptor inhibitor as drugs for treating neurodevelopmental disorders. However, these drugs have not shown significant effects as compared with placebos in patients with autism spectrum disorder, and there are currently no approved drugs and usage that make it possible to treat reciprocal social interaction disorder/deficiency.

DISCLOSURE OF INVENTION

Technical Problem

There is a demand for the development of drugs and therapeutic usage that make it possible to ameliorate or treat the main symptoms of patients with neurodevelopmental disorders, including autism spectrum disorder. In particular, there is a need for the development of drugs and therapeutic usage that make it possible to treat reciprocal social interaction disorder/deficiency.

Solution to Problem

[1] One aspect of the present invention relates to a pharmaceutical composition for treating an individual having a disease selected from communication disorder, abnormal motor ability, cognitive disorder, mental disorder, sensory disturbance, autism spectrum disorder, and pervasive developmental disorder, wherein the pharmaceutical composition comprises L-serine or a pharmaceutically acceptable salt thereof.

[2] In [1] described above, the autism spectrum disorder may be childhood autism.

[3] In [1] or [2] described above, the L-serine or the pharmaceutically acceptable salt thereof may be administered twice a day to the individual.

[4] In any one of [1] to [3] described above, the pharmaceutical composition may be a formulation for oral administration.

[5] In any one of [1] to [4] described above, the pharmaceutical composition may be a syrup formulation.

[6] In any one of [1] to [5] described above, the individual may be 18 years old or younger.

[7] In any one of [1] to [6] described above, the individual may be 13 years old or younger, 11 years old or younger, 7 years old or younger, less than 7 years old, 2 years old to 7 years old, or 2 years old to 6 years old.

[8] In any one of [1] to [7] described above, a body weight of the individual may be 10 to 100 kg.

[9] In any one of [1] to [8] described above, a body weight of the individual may be 10 to 60 kg.

[10] In any one of [1] to [9] described above, a total daily administration dosage of the L-serine or the pharmaceutically acceptable salt thereof may be 1 g to 60 g.

[11] In any one of [1] to [10] described above, a total daily administration dosage of the L-serine or the pharmaceutically acceptable salt thereof may be 2 g to 30 g or 2 g to 28 g.

[12] In any one of [1] to [10] described above, a total daily administration dosage of the L-serine or the pharmaceutically acceptable salt thereof may be 2 g to 15 g or 2 g to 14 g.

[13] In any one of [1] to [10] described above, a total daily administration dosage of the L-serine or the pharmaceutically acceptable salt thereof may be 4 g to 30 g or 4 g to 28 g.

[14] In any one of [1] to [13] described above, a total daily administration dosage of the L-serine or the pharmaceutically acceptable salt thereof may be 100 mg/kg to 600 mg/kg.

[15] In [14] described above, a total daily administration dosage of the L-serine or the pharmaceutically acceptable salt thereof may be 140 mg/kg to 580 mg/kg or 140 mg/kg to 572 mg/kg.

[16] In any one of [1] to [13] described above, a total daily administration dosage of the L-serine or the pharmaceutically acceptable salt thereof may be 200 mg/kg to 400 mg/kg, 280 mg/kg to 580 mg/kg, or 280 mg/kg to 572 mg/kg.

[17] In any one of [1] to [14] described above, a single administration dosage of the L-serine or the pharmaceutically acceptable salt thereof may be 70 mg/kg to 280 mg/kg, 140 mg/kg to 290 mg/kg, or 140 mg/kg to 286 mg/kg.

[18] In any one of [1] to [17] described above, the composition may further comprise one or more among a sweetener, a thickener, a pH adjusting agent, a preservative, and a solvent.

[19] Another aspect of the present invention provides a method for treating a disease selected from communication disorder, abnormal motor ability, cognitive disorder, mental disorder, sensory disturbance, autism spectrum disorder, and pervasive developmental disorder, wherein the method comprises a step of administering L-serine or a pharmaceutically acceptable salt thereof to an individual having the disease.

[20] In [19] described above, the autism spectrum disorder may be childhood autism.

[21] In [19] or [20] described above, the L-serine or the pharmaceutically acceptable salt thereof may be administered twice a day to the individual.

[22] In any one of [19] to [21] described above, the L-serine or the pharmaceutically acceptable salt thereof may be orally administered to the individual.

[23] In any one of [19] to [22] described above, the L-serine or the pharmaceutically acceptable salt thereof may be administered to the individual as a syrup formulation.

[24] In any one of [19] to [22] described above, the individual may be 18 years old or younger.

[25] In any one of [19] to [24] described above, the individual may be 13 years old or younger, 11 years old or younger, 7 years old or younger, less than 7 years old, 2 years old to 7 years old, or 2 years old to 6 years old.

[26] In any one of [19] to [25] described above, a body weight of the individual may be 10 to 100 kg.

[27] In any one of [19] to [26] described above, a body weight of the individual may be 10 to 60 kg.

[28] In any one of [19] to [27] described above, a total daily administration dosage of the L-serine or the pharmaceutically acceptable salt thereof may be 1 g to 60 g.

[29] In any one of [19] to [28] described above, a total daily administration dosage of the L-serine or the pharmaceutically acceptable salt thereof may be 2 g to 30 g or 2 g to 28 g.

[30] In any one of [19] to [28] described above, a total daily administration dosage of the L-serine or the pharmaceutically acceptable salt thereof may be 2 g to 15 g or 2 g to 14 g.

[31] In any one of [19] to [28] described above, a total daily administration dosage of the L-serine or the pharmaceutically acceptable salt thereof may be 4 g to 30 g or 4 g to 28 g.

[32] In any one of [19] to [31] described above, a total daily administration dosage of the L-serine or the pharmaceutically acceptable salt thereof may be 100 mg/kg to 600 mg/kg.

[33] In [32] described above, a total daily administration dosage of the L-serine or the pharmaceutically acceptable salt thereof may be 140 mg/kg to 580 mg/kg or 140 mg/kg to 572 mg/kg.

[34] In any one of [19] to [31] described above, a total daily administration dosage of the L-serine or the pharmaceutically acceptable salt thereof may be 200 mg/kg to 400 mg/kg, 280 mg/kg to 580 mg/kg, or 280 mg/kg to 572 mg/kg.

[35] In any one of [19] to [31] described above, a single administration dosage of the L-serine or the pharmaceutically acceptable salt thereof may be 70 mg/kg to 280 mg/kg, 140 mg/kg to 290 mg/kg, or 140 mg/kg to 286 mg/kg.

[36] Still another aspect of the present invention relates to use of the pharmaceutical composition described in [1] to [18] above for manufacturing a medicament for ameliorating, preventing, or treating a disease selected from communication disorder, abnormal motor ability, cognitive disorder, mental disorder, sensory disturbance, autism spectrum disorder, and pervasive developmental disorder.

Advantageous Effects of Invention

In one embodiment of the present invention, communication, daily living skills, socialization, motor skills, maladaptive behavior, and clinical global impression-severity in patients were ameliorated by oral administration of L-serine to patients with autism spectrum disorder, and the earlier start of the administration of L-serine (for example, 7 years old or younger or less than 7 years old), gave the more excellent effects of ameliorating communication, daily living skills, socialization, and motor skills, maladaptive behavior in patients, and parental stress.

BRIEF DESCRIPTION OF FIGURES

FIG. 1A is a figure illustrating the outline of the sociality experiment, and FIG. 1B is a figure illustrating the outline of the social cognition experiment. FIG. 1C and FIG. 1D are figures that illustrate the results of the sociality experiment. FIG. 1E and FIG. 1F are figures that illustrate the results of the social cognition experiment. In FIGS. 1A-1F, * indicates p-value <0.05,  indicates p-value <0.01, * indicates p-value <0.001, **** indicates p-value <0.0001, and ns indicates not being statistically significant.

FIGS. 2A-2D illustrate an elevated plus maze that is used in an anxiety experiment in the model of autism spectrum disorder, and the result of the anxiety experiment. FIG. 2A is a schematic view of the elevated plus maze that is used in the anxiety experiment in the model of autism spectrum disorder, FIG. 2B is a schematic view of heatmaps that track the movement of mice during a behavioral test, and FIG. 2C and FIG. 2D are figures that respectively illustrate the results of the anxiety experiment. In FIGS. 2A-2D, * indicates p-value <0.05,  indicates p-value <0.01, * indicates p-value <0.001, and ns indicates not being statistically significant.

FIGS. 3A and 3B illustrate the experiment results obtained by checking, with a patch clamp, an effect of normalizing dopamine secretion in the model of autism spectrum disorder. FIG. 3A is a figure that illustrates the results of the analysis of the firing rate of the spontaneous action potential in the midbrain VTA region in the control group and each experimental group, and FIG. 3B is a figure that illustrates the results of the analysis of the electric potential frequency in the control group and each experimental group. In FIGS. 3A and 3B, * indicates p-value <0.05, and ** indicates p-value <0.01.

FIG. 4A is a figure obtained by carrying out an overall observation of the prelimbic cortex, FIG. 4B is a figure obtained by observing the distribution of the dendritic spine density of cortical layer 5 pyramidal neurons with a confocal microscope system, and FIG. 4C is a figure that illustrates the dendritic spine density of cortical layer 5 pyramidal neurons between groups. In FIGS. 4A-4C,  indicates p-value <0.01, and ** indicates p-value <0.0001.

FIG. 5A is a figure that illustrates the firing rate of the action electric potential due to current injection, and FIG. 5B is a figure that illustrates a change in the firing rate in FIG. 8A. In FIGS. 5A and 5B,  indicates p-value <0.01, * indicates p-value <0.001, and **** indicates p-value <0.0001.

FIG. 12 is a figure that is obtained by analyzing an amount of score change (in a FAS population) in the K-VABS-II 2-Domain Composite (the average of the standard scores for both communication and sociality, hereinafter referred to as 2DC) at times of 12 weeks, 24 weeks, and 36 weeks after the start of the clinical trial, with respect to the amount of score change at the time of the start of phase 2 clinical trial.

FIG. 14 is a figure that is obtained by analyzing an amount of change (in a PPS population) in the K-VABS-II ABC at times of 12 weeks, 24 weeks, and 36 weeks, with respect to the amount of change at the time of the start of phase 2 clinical trial.

FIG. 17 is a figure that illustrates, in patients who have participated in the clinical trial of the 52-week continuous administration, a tendency (line plot) of the amount of score change in the CGI-S score (in a FAS population) in two groups for each time from the time of the start of phase 2 clinical trial to the time of the completion of the clinical trial of the 52-week continuous administration.

FIG. 18 is a figure that illustrates the results obtained by predicting a pattern of the K-VABS-II ABC score in a case where AST-001 is administered for 12 weeks in a simulation analysis for administration dosage modeling to be used in a phase 3 clinical trial.

BEST MODE FOR CARRYING OUT THE INVENTION

L-Serine or Pharmaceutically Acceptable Salt Thereof

Figure 1A:
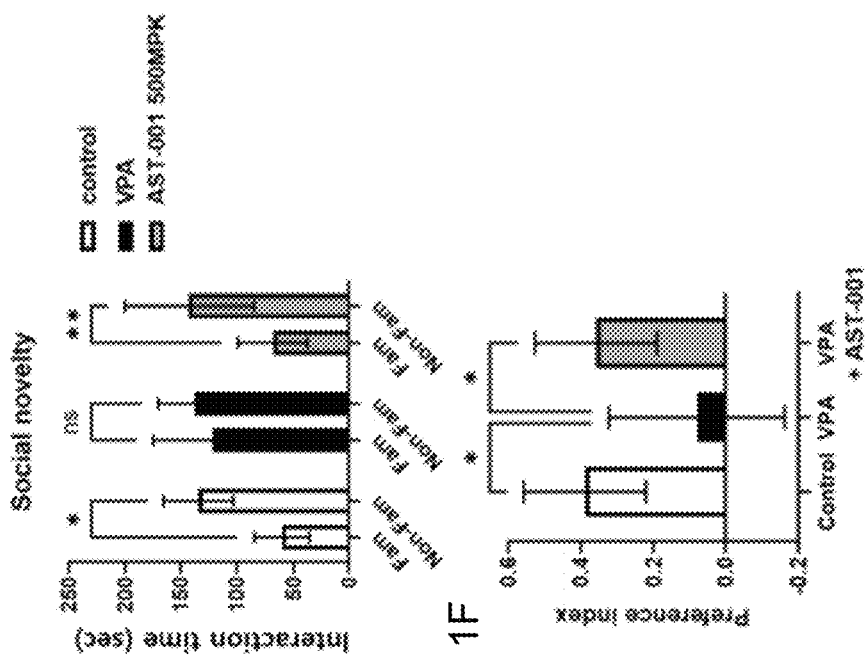
FIGS. 1A-1F illustrate an outline of a sociality experiment and an outline of a social cognition experiment in a model of autism spectrum disorder, and the results of the sociality experiment and the social cognition experiment.

The L-serine used in the present invention is a chemical compound denoted by Chemical Formula 1 below.

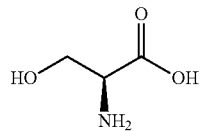

[Chemical Formula 1]

The pharmaceutically acceptable salt of the L-serine is a salt that is commonly used in the pharmaceutical industry, where the salt may be an inorganic salt, an inorganic acid salt, an organic acid salt, a sulfonic acid salt, or the like.

Targeted Disease for being Treated or Ameliorating Symptom

In an aspect of the present invention, a target disease for being treated or ameliorating symptoms by administering L-serine or a pharmaceutically acceptable salt thereof may be a disease selected from communication disorder, abnormal motor ability, cognitive disorder, mental disorder, sensory disturbance, autism spectrum disorder, and pervasive developmental disorder.

The treatment of the disease may include alleviating symptoms of the disease or preventing the disease.

The communication disorder refers to a disease that causes a trouble in the ability to communicate, and it may appear in a variety of diseases such as a neurological disease (for example, traumatic brain injury), a mental disorder (for example, panic disorder, post-traumatic stress disorder), autism spectrum disorder, and language disorder.

The abnormal motor ability occurs due to problems in the ability to move the body, and it may occur in various diseases including a neurological disease, mental disorder, and autism spectrum disorder.

The cognitive disorder occurs due to problems in the cognitive ability to recognize surrounding objects, humans, or the environment, and it may appear in a neurological disease, mental disorder, or autism spectrum disorder.

The mental disorder refers to a psychological health problem that continuously interferes with or limits normal thinking, feelings, behavior, or interpersonal relationships, and it may appear in depression, manic depressive psychosis, panic disorder, sadness, schizophrenia, neurosis, obsessive-compulsive disorder, post-traumatic stress disorder, and cognitive disorder.

The sensory disturbance occurs due to an abnormality in the sense of recognizing stimuli received from outside, and it may appear in a neurological disease, mental disorder, or autism spectrum disorder.

The pervasive developmental disorder includes delays in an individual's ability that should be developed normally during physical and mental development, such as motor ability, cognitive ability, and sensory ability.

The autism spectrum disorder is known as a neurodevelopmental disorder syndrome that is accompanied by not only a core symptom such as trouble in reciprocal social interaction but also anxiety. Non-restrictive examples of the autism spectrum disorder include, but not limited to, autistic disorder, childhood autism, diseases including widespread developmental disorder and Asperger syndrome, Angelman syndrome, fragile X syndrome, fragile X-associated tremor/ataxia syndrome (FXTAS), Rett syndrome, Landau-Kleffner syndrome, Prader-Willi syndrome, tardive dyskinesia, and Williams syndrome.

In addition, a subject having the autism spectrum disorder may meet the requirements for autism spectrum disorder, according to DSM-5 (a diagnosis of autism spectrum disorder defined by Diagnostic and Statistical Manual of Mental Disorders, Fifth Edition, Text Revision) and/or Autism Diagnostic Interview-Revised (ADI-R).

Pharmaceutical Composition and Use Thereof

One aspect of the present invention relates to a pharmaceutical composition for treating an individual having a disease selected from communication disorder, abnormal motor ability, cognitive disorder, mental disorder, sensory disturbance, autism spectrum disorder, and pervasive developmental disorder, where the pharmaceutical composition comprises L-serine or a pharmaceutically acceptable salt thereof.

In one embodiment of the present invention, the autism spectrum disorder may be childhood autism. The above childhood autism is a disease name classified as the Korean Classification of Disease Code F84.0 or the International Classification of Disease (ICD) F84.0.

In another embodiment of the present invention, L-serine or a pharmaceutically acceptable salt thereof may be administered to the subject more than once a day, once a day, twice a day, three times a day, four times a day, or five times a day; however, it is preferably administered thereto twice a day.

In still another embodiment of the present invention, the pharmaceutical composition may be a formulation for parenteral administration or a formulation for oral administration, and it may be preferably a formulation for oral administration. The pharmaceutical composition according to the present invention may be formulated by being mixed with a pharmaceutically acceptable excipient.

In one embodiment of the present invention, the pharmaceutical composition may be a syrup formulation.

In another embodiment of the present invention, the subject may be an adult, or the subject may be 1 year old, 2 years old, 3 years old, 4 years old, 5 years old, 6 years old, 7 years old, 8 years old, 9 years old, 10 years old, 11 years old, 12 years old, 13 years old, 14 years old, 15 years old, 16 years old, 17 years old, or 18 years old, and may be preferably 18 years or younger, 13 years or younger, 11 years or younger, 7 years or younger, less than 7 years old, 2 years old to 7 years old, or 2 years old to 6 years old. In addition, the individual is a child, who may be 1 year old, 2 years old, 3 years old, 4 years old, 5 years old, 6 years old, 7 years old, 8 years old, 9 years old, 10 years old, 11 years old, 12 years old, 13 years old, 14 years old, 15 years old, 16 years old, 17 years old, or 18 years old, or may be 18 years or younger, 13 years or younger, 11 years or younger, 7 years or younger, less than 7 years old, 2 years old to 7 years old, or 2 years old to 6 years old.

In still another embodiment of the present invention, the body weight of the subject may be 10 to 100 kg, 10 to 90 kg, 10 to 80 kg, 10 to 70 kg, or 10 to 60 kg.

In one embodiment of the present invention, the total daily administration dosage of the L-serine or the pharmaceutically acceptable salt thereof may be one or more selected from the group consisting of 1 g, 2 g, 3 g, 4 g, 5 g, 6 g, 7 g, 8 g, 9 g, 10 g, 11 g, 12 g, 13 g, 14 g, 15 g, 16 g, 17 g, 18 g, 19 g, 20 g, 21 g, 22 g, 23 g, 24 g, 25 g, 26 g, 27 g, 28 g, 29 g, 30 g, 31 g, 32 g, 33 g, 34 g, 35 g, 36 g, 37 g, 38 g, 39 g, 40 g, 41 g, 42 g, 43 g, 44 g, 45 g, 46 g, 47 g, 48 g, 49 g, 50 g, 51 g, 52 g, 53 g, 54 g, 55 g, 56 g, 57 g, 58 g, 59 g, 60 g, 61 g, 62 g, 63 g, 64 g, 65 g, 66 g, 67 g, 68 g, 69 g, 70 g, 71 g, 72 g, 73 g, 74 g, 75 g, 76 g, 77 g, 78 g, 79 g, 80 g, 81 g, 82 g, 83 g, 84 g, 85 g, 86 g, 87 g, 88 g, 89 g, 90 g, 91 g, 92 g, 93 g, 94 g, 95 g, 96 g, 97 g, 98 g, 99 g, and 100 g, or it may be 1 g to 60 g, 2 g to 30 g, 2 g to 28 g, or 4 g to 28 g. In addition, the daily administration dosage of the L-serine or the pharmaceutically acceptable salt thereof may be 2 g, 4 g, 7 g, 8 g, 10 g, 12 g, 14 g, 20 g, or 28 g, depending on the body weight of the individual, and the total daily administration dosage of the L-serine or the pharmaceutically acceptable salt thereof may be the daily administration dosage for each body weight, which is described in Table 4 and Table 15.

In another embodiment of the present invention, the daily administration dosage of the L-serine or the pharmaceutically acceptable salt thereof may be 2 g to 15 g or 2 g to 14 g, or 4 g to 30 g or 4 g to 28 g.

In another embodiment of the present invention, the daily administration dosage of the L-serine or the pharmaceutically acceptable salt thereof may be 100 mg/kg to 600 mg/kg, 140 mg/kg to 580 mg/kg, 140 mg/kg to 572 mg/kg, 200 mg/kg to 400 mg/kg, 280 mg/kg to 580 mg/kg, or 280 mg/kg to 572 mg/kg. In addition, the daily administration dosage of the L-serine or the pharmaceutically acceptable salt thereof may be 180 mg/kg, 300 mg/kg, 480 mg/kg, or 600 mg/kg. In addition, the total daily administration dosage of the L-serine or the pharmaceutically acceptable salt thereof may be, depending on the body weight of the individual, about 285.7 to about 400 mg/kg, about 333.3 to about 533.3 mg/kg, about 378.4 to about 560 mg/kg, about 392.2 to about 526.3 mg/kg, about 466.7 to about 538.5 mg/kg, about 142.9 to about 200 mg/kg, about 166.7 to about 266.7 mg/kg, about 189.2 to about 280 mg/kg, about 196.1 to about 263.2 mg/kg, about 233.3 to about 269.2 mg/kg, or about 200 mg/kg to about 400 mg/kg, may be about 285 to about 400 mg/kg, about 333 to about 534 mg/kg, about 378 to about 560 mg/kg, about 392 to about 527 mg/kg, about 466 to about 539 mg/kg, about 142 to about 200 mg/kg, about 166 to about 267 mg/kg, about 189 to about 280 mg/kg, about 196 to about 264 mg/kg, about 233 to about 270 mg/kg, about 200 mg/kg to about 400 mg/kg, or about 307.7 to 400 mg/kg, or may be about 400 mg/kg to about 571.4 mg/kg, about 352.9 mg/kg to about 571.4 mg/kg, about 408.2 mg/kg to about 571.4 mg/kg, about 280 mg/kg, about 311.1 mg/kg, about 350 mg/kg, about 400 mg/kg, about 466.7 mg/kg, or about 560 mg/kg, and it may be the daily administration dosage for each body weight, which is described in Table 4 and Table 15.

In another embodiment of the present invention, the single dose of the L-serine or the pharmaceutically acceptable salt thereof may be 70 mg/kg to 280 mg/kg, 140 mg/kg to 290 mg/kg, or 140 mg/kg to 286 mg/kg. In addition, the single dose of the L-serine or the pharmaceutically acceptable salt thereof may be about 142.9 to about 200 mg/kg, about 166.7 to about 266.7 mg/kg, about 189.2 to about 280 mg/kg, about 196.1 to about 263.2 mg/kg, about 233.3 to about 269.2 mg/kg, about 71.4 to about 100 mg/kg, about 83.3 to about 133.3 mg/kg, about 94.6 to about 140 mg/kg, about 98 to about 131.6 mg/kg, or about 116.7 to about 134.6 mg/kg, or may be about 142 to about 200 mg/kg, about 166 to about 267 mg/kg, about 189 to about 280 mg/kg, about 196 to about 264 mg/kg, about 233 to about 270 mg/kg, about 71 to about 100 mg/kg, about 83 to about 134 mg/kg, about 94 to about 140 mg/kg, about 98 to about 132 mg/kg, about 116 to about 135 mg/kg, about 153.8 to about 200 mg/kg, about 200 to about 285.7 mg/kg, about 176.5 to about 285.7 mg/kg, about 204.1 to about 285.7 mg/kg, about 140 mg/kg, about 155.6 mg/kg, about 175 mg/kg, about 200 mg/kg, about 233.3 mg/kg, or about 280 mg/kg, and it may be the single dose for each body weight, which is described in Table 4 and Table 15.

In one embodiment of the present invention, the pharmaceutical composition may comprise one or more among a sweetener, a thickener, a pH adjusting agent, a solvent, and a preservative.

A substance to be used as the sweetener may be any substance that is used to improve the taste, stability, or mixability of a pharmaceutical composition, in the technical field to which the invention according to the present application belongs. The sweetener to be used may be sorbitol, maltodextrin, fructose, glycerin, propylene glycol, peanut oil, sorbitan, stevia, white sugar, or the like; however, it is not limited thereto. Preferably, one or more sweeteners selected from white sugar, sorbitol, acesulfame, and sucralose may be used.

A substance to be used as the thickener may be any substance that is used to improve the stability and consistency of a pharmaceutical composition, in the technical field to which the invention according to the present application belongs. The thickener to be used may be carboxymethyl cellulose (CMC), hydroxypropyl methyl cellulose (HPMC), polyvinyl pyrrolidone, polyethylene oxide, gum arabic, sorbitol, polysorbate, or the like; however, it is not limited thereto, and preferably, carboxymethyl cellulose may be used.

A substance to be used as the pH adjusting agent may be any substance that is used to adjust the pH of a pharmaceutical composition, in the technical field to which the invention according to the present application belongs. The pH adjusting agent to be used may be a basic pH adjusting agent, an acidic pH adjusting agent, a phosphate buffer agent, sodium bicarbonate, an ammonia solution, sodium chloride, or the like; however, it is not limited thereto, and preferably an acidic pH adjusting agent, and more preferably citric acid (for example, citric acid hydrate, potassium citrate monohydrate) may be used.

A substance to be used as the preservative may be any substance that is used to maintain the stability and keep the effectiveness of a pharmaceutical composition, in the technical field to which the invention according to the present application belongs. The preservative to be used may be sodium benzoate, benzyl alcohol, a paraben, formaldehyde, or the like, and methyl paraoxybenzoate and/or propyl paraoxybenzoate may be preferable.

The solvent comprised in the pharmaceutical composition is a solvent that is commonly used in the technical field to which the invention according to the present application belongs, where purified water, an alcohol solvent, acetone, or the like may be used, and purified water may be preferable.

In one embodiment of the present invention, the pharmaceutical composition may comprise carboxymethyl cellulose, citric acid, a sweetener, and purified water, the sweetener may be a combination of white sugar and sorbitol or a combination of sucralose and acesulfame, and the pharmaceutical composition may additionally include methyl paraoxybenzoate and/or propyl para-oxybenzoate.

In still another embodiment of the present invention, the pharmaceutical composition may comprise one or more among a sweetener, a thickener, a pH adjusting agent, a solvent, a preservative, and a flavoring substance. A substance to be used as the flavoring substance may be any substance that is used to impart fragrance to a pharmaceutical composition or to improve the user's experience, in the technical field to which the invention according to the present application belongs. The flavoring substance to be used may be peppermint oil, lemon essential oil, vanilla extract, a spice, or the like.

Still another aspect of the present invention relates to use of the pharmaceutical composition described above, where the use is for manufacturing a medicament for ameliorating, preventing, or treating a disease selected from communication disorder, abnormal motor ability, cognitive disorder, mental disorder, sensory disturbance, autism spectrum disorder, and pervasive developmental disorder.

Treatment Method

An aspect of the present invention relates to a method for treating a disease selected from communication disorder, abnormal motor ability, cognitive disorder, mental disorder, sensory disturbance, autism spectrum disorder, and pervasive developmental disorder, where the method for treating a disease includes a step of administering L-serine or a pharmaceutically acceptable salt thereof to an individual having the disease.

In one embodiment of the method treating the disease of the present invention, the autism spectrum disorder may be childhood autism. The above childhood autism is a disease name classified as the Korean Classification of Disease Code F84.0 or the International Classification of Disease (ICD) F84.0.

In another embodiment of the method treating the disease of the present invention, L-serine or a pharmaceutically acceptable salt thereof may be administered to the subject more than once a day, once a day, twice a day, three times a day, four times a day, or five times a day; however, it is preferably administered thereto twice a day.

In still another embodiment of the method for treating a disease according to the present invention, the L-serine or the pharmaceutically acceptable salt thereof may be orally administered to the individual. In addition, the L-serine or the pharmaceutically acceptable salt thereof may be administered to the individual as a syrup formulation. In addition, for the individual, the L-serine or the pharmaceutically acceptable salt thereof may be formulated into the formulation for oral administration described above.

In one embodiment of the method treating the disease of the present invention, the subject may be an adult, or the subject may be 1 year old, 2 years old, 3 years old, 4 years old, 5 years old, 6 years old, 7 years old, 8 years old, 9 years old, 10 years old, 11 years old, 12 years old, 13 years old, 14 years old, 15 years old, 16 years old, 17 years old, or 18 years old, and may be preferably 18 years or younger, 13 years or younger, 11 years or younger, 7 years or younger, less than 7 years old, 2 years old to 7 years old, or 2 years old to 6 years old. In addition, the individual is a child, which may be 1 year old, 2 years old, 3 years old, 4 years old, 5 years old, 6 years old, 7 years old, 8 years old, 9 years old, 10 years old, 11 years old, 12 years old, 13 years old, 14 years old, 15 years old, 16 years old, 17 years old, or 18 years old, or may be 18 years or younger, 13 years or younger, 11 years or younger, 7 years or younger, less than 7 years old, 2 years old to 7 years old, or 2 years old to 6 years old.

In another embodiment of the method treating the disease of the present invention, the body weight of the subject may be 10 to 100 kg, 10 to 90 kg, 10 to 80 kg, 10 to 70 kg, or 10 to 60 kg.

In one embodiment of the method treating the disease of the present invention, the total daily administration dosage of the L-serine or the pharmaceutically acceptable salt thereof may be one or more selected from the group consisting of 1 g, 2 g, 3 g, 4 g, 5 g, 6 g, 7 g, 8 g, 9 g, 10 g, 11 g, 12 g, 13 g, 14 g, 15 g, 16 g, 17 g, 18 g, 19 g, 20 g, 21 g, 22 g, 23 g, 24 g, 25 g, 26 g, 27 g, 28 g, 29 g, 30 g, 31 g, 32 g, 33 g, 34 g, 35 g, 36 g, 37 g, 38 g, 39 g, 40 g, 41 g, 42 g, 43 g, 44 g, 45 g, 46 g, 47 g, 48 g, 49 g, 50 g, 51 g, 52 g, 53 g, 54 g, 55 g, 56 g, 57 g, 58 g, 59 g, 60 g, 61 g, 62 g, 63 g, 64 g, 65 g, 66 g, 67 g, 68 g, 69 g, 70 g, 71 g, 72 g, 73 g, 74 g, 75 g, 76 g, 77 g, 78 g, 79 g, 80 g, 81 g, 82 g, 83 g, 84 g, 85 g, 86 g, 87 g, 88 g, 89 g, 90 g, 91 g, 92 g, 93 g, 94 g, 95 g, 96 g, 97 g, 98 g, 99 g, and 100 g, or it may be 1 g to 60 g, 2 g to 30 g, 2 g to 28 g, or 4 g to 28 g. In addition, the daily administration dosage of the L-serine or the pharmaceutically acceptable salt thereof may be 2 g, 4 g, 7 g, 8 g, 10 g, 12 g, 14 g, 20 g, or 28 g, depending on the body weight of the individual, and the total daily administration dosage of the L-serine or the pharmaceutically acceptable salt thereof may be the daily administration dosage for each body weight, which is described in Table 4 and Table 15.

In still another embodiment of the method treating the disease of the present invention, the daily administration dosage of the L-serine or the pharmaceutically acceptable salt thereof may be 2 g to 15 g or 2 g to 14 g, or 4 g to 30 g or 4 g to 28 g.

In another embodiment of the method treating the disease of the present invention, the daily administration dosage of the L-serine or the pharmaceutically acceptable salt thereof may be 100 mg/kg to 600 mg/kg, 140 mg/kg to 580 mg/kg, 140 mg/kg to 572 mg/kg, 140 mg/kg to 580 mg/kg, or 140 mg/kg to 572 mg/kg. In addition, the daily administration dosage of the L-serine or the pharmaceutically acceptable salt thereof may be 180 mg/kg, 300 mg/kg, 480 mg/kg, or 600 mg/kg. In addition, the total daily administration dosage of the L-serine or the pharmaceutically acceptable salt thereof may be, depending on the body weight of the individual, about 285.7 to about 400 mg/kg, 333.3 to about 533.3 mg/kg, about 378.4 to about 560 mg/kg, about 392.2 to about 526.3 mg/kg, about 466.7 to about 538.5 mg/kg, about 142.9 to about 200 mg/kg, about 166.7 to about 266.7 mg/kg, about 189.2 to about 280 mg/kg, about 196.1 to about 263.2 mg/kg, about 233.3 to about 269.2 mg/kg, or about 200 mg/kg to about 400 mg/kg, may be about 285 to about 400 mg/kg, about 333 to about 534 mg/kg, about 378 to about 560 mg/kg, about 392 to about 527 mg/kg, about 466 to about 539 mg/kg, about 142 to about 200 mg/kg, about 166 to about 267 mg/kg, about 189 to about 280 mg/kg, about 196 to about 264 mg/kg, about 233 to about 270 mg/kg, about 200 mg/kg to about 400 mg/kg, or about 307.7 to 400 mg/kg, or may be about 400 mg/kg to about 571.4 mg/kg, about 352.9 mg/kg to about 571.4 mg/kg, about 408.2 mg/kg to about 571.4 mg/kg, about 280 mg/kg, about 311.1 mg/kg, about 350 mg/kg, about 400 mg/kg, about 466.7 mg/kg, or about 560 mg/kg, and it may be the daily administration dosage for each body weight, which is described in Table 4 and Table 15.

In one embodiment of the method treating the disease of the present invention, the total daily administration dosage of the L-serine or the pharmaceutically acceptable salt thereof may be 200 mg/kg to 400 mg/kg, 280 mg/kg to 580 mg/kg or 280 mg/kg to 572 mg/kg.

In still another embodiment of the method treating the disease of the present invention, the single dose of the L-serine or the pharmaceutically acceptable salt thereof may be 70 mg/kg to 280 mg/kg, 140 mg/kg to 290 mg/kg, or 140 mg/kg to 286 mg/kg. In addition, the single dose of the L-serine or the pharmaceutically acceptable salt thereof may be about 142.9 to about 200 mg/kg, about 166.7 to about 266.7 mg/kg, about 189.2 to about 280 mg/kg, about 196.1 to about 263.2 mg/kg, about 233.3 to about 269.2 mg/kg, about 71.4 to about 100 mg/kg, about 83.3 to about 133.3 mg/kg, about 94.6 to about 140 mg/kg, about 98 to about 131.6 mg/kg, or about 116.7 to about 134.6 mg/kg, or may be about 142 to about 200 mg/kg, about 166 to about 267 mg/kg, about 189 to about 280 mg/kg, about 196 to about 264 mg/kg, about 233 to about 270 mg/kg, about 71 to about 100 mg/kg, about 83 to about 134 mg/kg, about 94 to about 140 mg/kg, about 98 to about 132 mg/kg, about 116 to about 135 mg/kg, about 153.8 to about 200 mg/kg, about 200 to about 285.7 mg/kg, about 176.5 to about 285.7 mg/kg, about 204.1 to about 285.7 mg/kg, about 140 mg/kg, about 155.6 mg/kg, about 175 mg/kg, about 200 mg/kg, about 233.3 mg/kg, or about 280 mg/kg, and it may be the single dose for each body weight, which is described in Table 4 and Table 15.

Hereinafter, the present invention will be described in more detail according to the following examples. However, the following examples are only for the exemplary description of the present invention, and thus the scope of the present invention is not limited thereto.

Example 1. In Vivo Experiment of Autism Spectrum Disorder Animal Model

Example 1.1. Effect of Improving Sociality, Social Cognition, and Anxiety

Pregnant C57BL/6 mice were subcutaneously injected with valproic acid (VPA) at the time when the gestation period reached 12 days. Male mice were selected from the mice that were born from the pregnant mice that were subcutaneously injected with VPA, and these were used as animals for a mouse model of autism spectrum disorder.

Since 3-week-old mice are at the critical stage, 3-week-old normal mice and 3-week-old mice having autism spectrum disorder were subjected to a sociality experiment, a social cognition experiment, and an anxiety experiment to identify the underlying features. 500 mg/kg of L-serine (hereinafter, referred to as AST-001) was orally administered for 2 weeks to mice having autism spectrum disorder, in which the underlying features had been confirmed. The mice having autism spectrum disorder, to which AST-001 had been orally administered for 2 weeks, were again subjected to a sociality experiment, a social cognition experiment, and an anxiety experiment.

Sociality Experiment

A behavioral experiment, which checks whether or not an experimental mouse moves in the direction of a social object in a case where a social object (a non-familiar mouse) and a non-social object (an empty cage) are placed in both side rooms of a three-chamber having three connected rooms, was carried out (see FIG. 1A). For 2 weeks from the age of 3 weeks, the normal group and the autism spectrum disorder group were subjected to oral administration with water every day once a day, and in the drug group, mice having autism spectrum disorder were orally administered with 500 mg/kg of AST-001 (dissolved in water) once a day. 5-week-old normal mice (n=6) and 5-week-old mice having autism spectrum disorder (n=6) were used in the experiment. The 5-week-old normal mice showed a social preference index such that they moved in the direction of the social object, whereas the 5-week-old mice having autism spectrum disorder showed no social preference index. However, in the behavioral experiment in the group orally injected with AST-001 for 2 weeks, it was confirmed that the mouse having autism spectrum disorder has a social preference index such that the social object is more preferred (see FIG. 1C and FIG. 1D). Specifically, a mouse having autism spectrum disorder, which had not been administrated with AST-001, did not show a significant difference between an interaction time with the social object and an interaction time with the empty cage, where such a difference was at a level of statistically insignificant, and the preference index for the social object was low (see FIG. 1C and FIG. 1D). On the other hand, in the control group and in the mice having autism spectrum disorder, to which 500 mg/kg of AST-001 had been injected, the interaction time with the social object was significantly higher than the interaction time with the empty cage, where such a difference was at a level of statistically significant, and it turned out that the preference index for the social object is high (see FIG. 1C and FIG. 1D).

Social Cognition Experiment

Figure 1B:
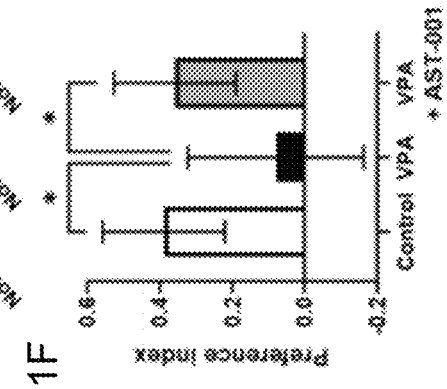
Figure 1C:
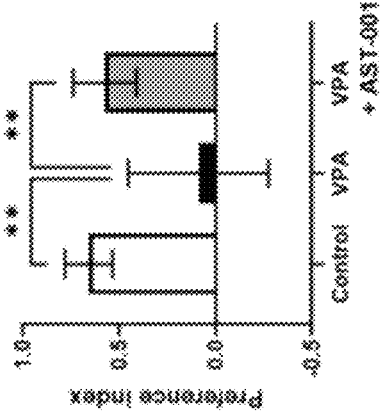
Figure 1D:
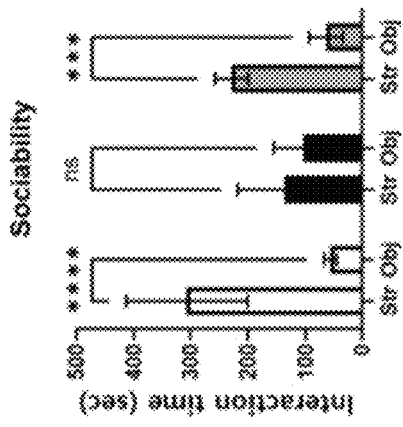
Figure 1E:
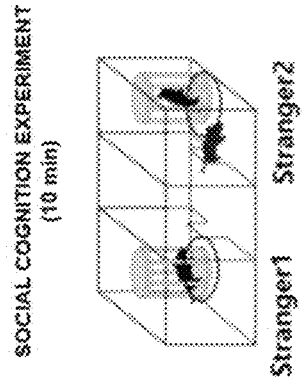
Figure 1F:
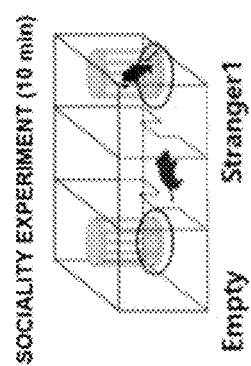

A social cognition experiment, which measures whether or not an experimental mouse moves in the direction of a non-familiar mouse in a case where the experimental mouse is placed between a non-familiar mouse and a familiar mouse, was carried out (see FIG. 1B). For 2 weeks from the age of 3 weeks, the normal group and the autism spectrum disorder group were subjected to oral administration with water every day once a day, and in the drug group, mice having autism spectrum disorder were orally administered with 500 mg/kg of AST-001 (dissolved in water) once a day. 5-week-old normal mice (n=6) and 5-week-old mice having autism spectrum disorder (n=6) were used in the experiment. It turned out that the 5-week-old normal mice moves more preferably in the direction of a non-familiar mouse, whereas the 5-week-old mice having autism spectrum disorder showed no preference index for the non-familiar mouse. However, in the social cognition experiment in the group orally administered with AST-001 for 2 weeks, the mouse having autism spectrum disorder showed an increased preference index for the non-familiar mouse (see FIG. 1E and FIG. 1F). Specifically, a mouse having autism spectrum disorder, which had not been administrated with AST-001, did not show a significant difference between an interaction time with the familiar mouse and an interaction time with the non-familiar mouse, where such a difference was at a level of statistically insignificant, and the preference index for the non-familiar mouse was low (see FIG. 1E and FIG. 1F). On the other hand, in the control group and the mice having autism spectrum disorder, to which 500 mg/kg of AST-001 had been injected, the interaction time with the non-familiar mouse was significantly higher than the interaction time with the familiar mouse, where such a difference was at a level of statistically significant, and it turned out that the preference index for the non-familiar mouse is high (see FIG. 1E and FIG. 1F). In other words, the oral administration of AST-001 was confirmed to improve social cognition in a mouse having autism spectrum disorder.

Anxiety Experiment

An anxiety experiment, which tests whether or not an experimental mouse shows an anxiety behavior to avoid an open-arm space in a case where the experimental mouse is placed in an elevated plus maze device, was carried out (see FIG. 2A). For 2 weeks from the age of 3 weeks, the normal group and the autism spectrum disorder group were subjected to oral administration with water every day once a day, and in the drug group, mice having autism spectrum disorder were orally administered with 500 mg/kg of AST-001 (dissolved in water) once a day. 5-week-old normal mice (n=6) and 5-week-old mice having autism spectrum disorder (n=6) were used in the experiment. The 5-week-old mice having autism spectrum disorder showed features such that they tried to avoid the open-arm space as compared with the 5-week-old normal mice. However, in the anxiety experiment in the group orally injected with AST-001 for 2 weeks, the mice having autism spectrum disorder showed a decrease in the degree of anxiety, and they spent an increased time going to the open-arm space (see FIGS. 2B to 2D). Specifically, a mouse having autism spectrum disorder, which had not been administrated with AST-001, spent a very short time staying in the open-arm space of the elevated plus maze and spent a long time in staying in the closed-arm space of the elevated plus maze (see FIG. 2C and FIG. 2D). However, it turned out that the control group and the mice having autism spectrum disorder, to which 500 mg/kg of AST-001 had been injected, spent a remarkably long time staying in the open-arm space of the elevated plus maze and spent a short time in staying in the closed-arm space of the elevated plus maze, as compared with a mouse having autism spectrum disorder, which had not been administrated with AST-001 (see FIG. 2C and FIG. 2D). As a result, the oral administration of AST-001 was confirmed to ameliorate the degree of anxiety in a mouse having autism spectrum disorder.

Example 1.2. Effect of Normalizing Dopamine Secretion

A mouse model of autism spectrum disorder was created with the method described in Example 1.1. The 3-week-old male mice having autism spectrum disorder were divided into a group (n=6) orally injected with 250 mg/kg of AST-001 for 2 weeks and a group (n=6) orally injected with 500 mg/kg of AST-001 for 2 weeks, and were orally administered with AST-001. The 3-week-old male normal mouse group and the autism spectrum disorder mouse group (n=6)

were orally administered with water once a day for 2 weeks and then used as a control group (n=6) in the behavioral experiment.

The spontaneous action potential of dopamine neurons in the midbrain VTA region of the 5-week-old normal mice and the 5-week-old mice having autism spectrum disorder was checked with a patch clamp. It turned out that mice having autism spectrum disorder show a reduced firing rate of the spontaneous action potential as compared with the normal mice (see FIG. 3A). As a result, dopamine secretion has been reduced in a mouse having autism spectrum disorder, and it can be seen that the reduced dopamine secretion has caused behavioral abnormalities related to the dopamine pathway, such as attention, reward, and cognition.

However, after the oral administration with AST-001 for 2 weeks, it turned out that the firing rate of the spontaneous action potential of mice having autism spectrum disorder was similar to that of normal mice (FIG. 3A and FIG. 3B). As a result, it was confirmed that the administration of 250 mg/kg to 500 mg/kg of AST-001 increases dopamine secretion in a having autism spectrum disorder.

Example 1.3. Effect of Normalizing Synaptic Pruning

Figure 4A:
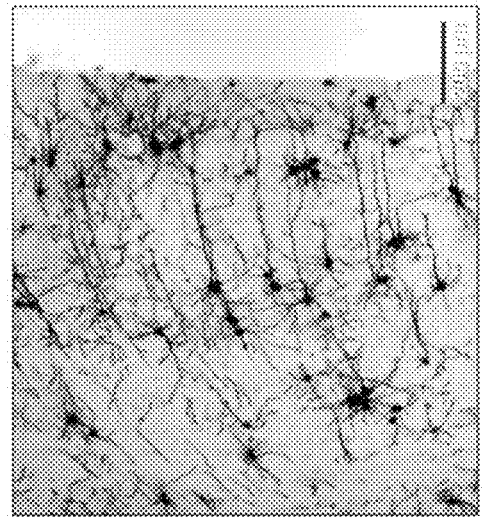
FIGS. 4A-4C illustrate the results obtained by carrying an experiment to check the effect of normalizing synaptic pruning in the model of autism spectrum disorder.

A mouse model of autism spectrum disorder was created with the method described in Example 1.1. It is known that in autism spectrum disorder, the number of dendrites increases more than necessary due to troubles in synaptic pruning at the critical stage. Therefore, an experiment, which checks whether or not the number of dendrites can be normalized by AST-001 administration, was carried out. For reference, the results obtained by observing the prelimbic cortex with a confocal microscope system are shown in FIG. 4A.

Figure 4B:
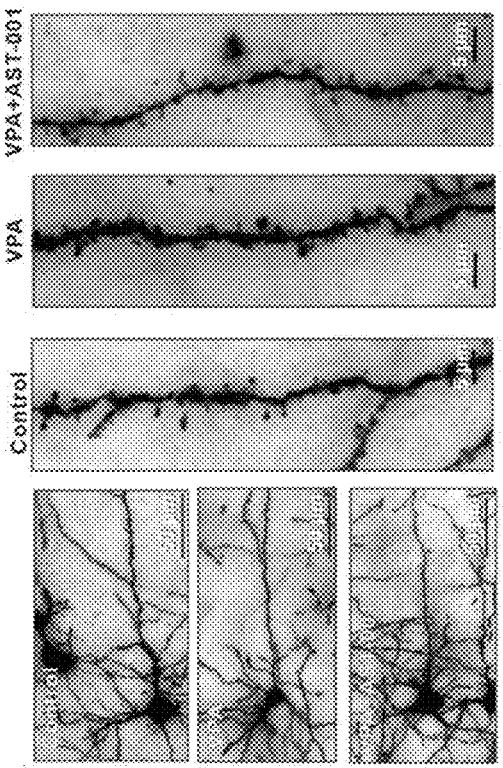
Figure 4C:
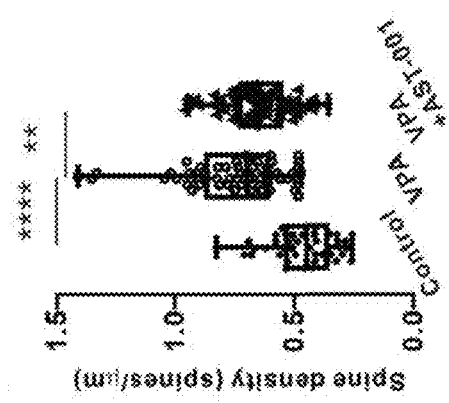

After oral administration of 400 mg/kg of AST-001 for 2 weeks to 3-week-old male autism spectrum disorder mice (n=8), it was checked whether or not the spine density of the synaptic dendrites was similar to that of the control group male normal mice (n=3). It turned out that the number of dendrites in mice having autism spectrum disorder was significantly reduced and similar to that of the control group (see FIG. 4B and FIG. 4C). As a result, it was confirmed that oral administration of AST-001 normalizes synaptic pruning at the critical stage in autism spectrum disorder.

Example 1.4. Effect of Normalizing Nerve Cell Activity

Figure 5B:
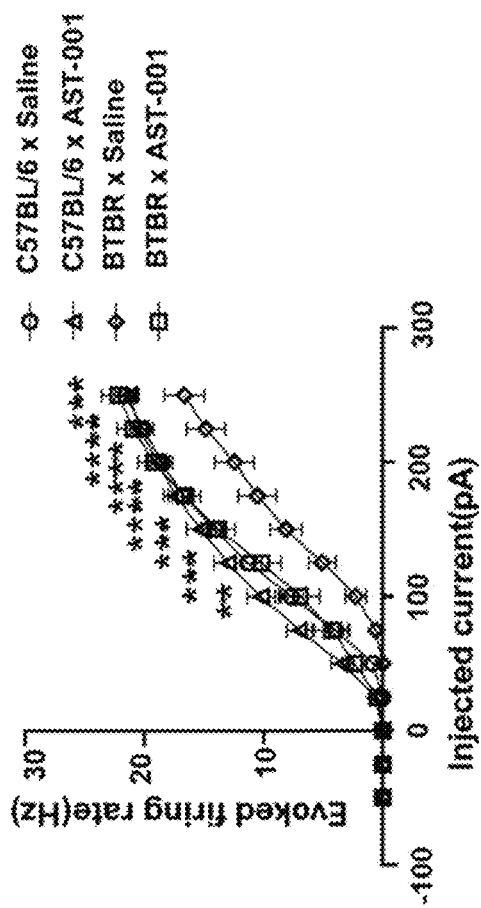
FIGS. 5A and 5B illustrate the experiment results obtained by checking the intrinsic excitability of mPFC pyramidal neurons in the model of autism spectrum disorder by using a patch clamp.
Figure 5A:
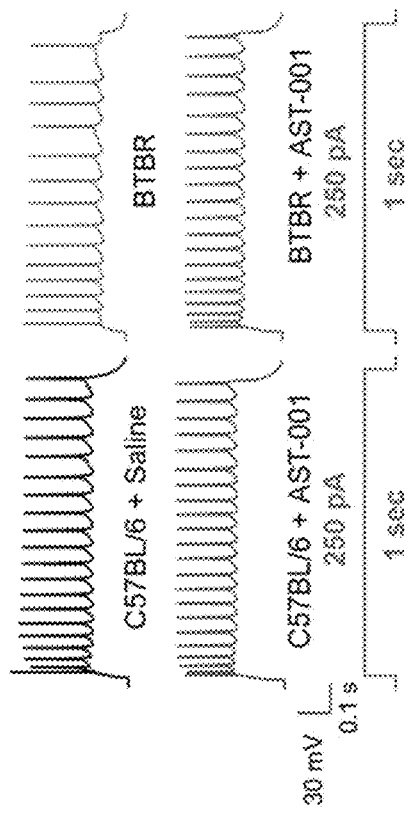

BTBR T+tf/J (BTBR), which is an animal of autism spectrum disorder, and C57BL/6 mice (used as a control group) were purchased from Jackson Laboratories. In a case where the 3-week-old BTBR mice (n=3) and C57BL/6 mice (n=3) were subjected to the measurement of the intrinsic excitability of mPFC pyramidal neurons using a patch clamp through the firing rate of the action potential due to current injection, the BTBR mice showed a reduced firing rate of the action potential as compared with the control group (see FIG. 5A). However, in a case where BTBR mice were orally administered with 500 mg/kg of AST-001 for 2 weeks, and then the firing rate of the action potential was measured, the firing rate of the action potential in the BTBR mice and the control group mice turned out to be similar (see FIG. 5B).

Example 1.5. Effect of Improving Individual Recognition and Spatial Memory

Individual Recognition Experiment

Mice having autism spectrum disorder were created by the same method as in Example 1.1. The 3-week-old male mice having autism spectrum disorder were orally injected with 180, 300, 480, or 600 mg/kg/day of L-serine for 21 days and then subjected to an individual recognition test. Eight mice were used for each experimental group.

Mice tend to be more interested in a novel object than a familiar object. Therefore, a novel object recognition (NOR) experiment, which is an experiment for checking whether or not mice recognize a novel object, was carried out.

Figure 6:
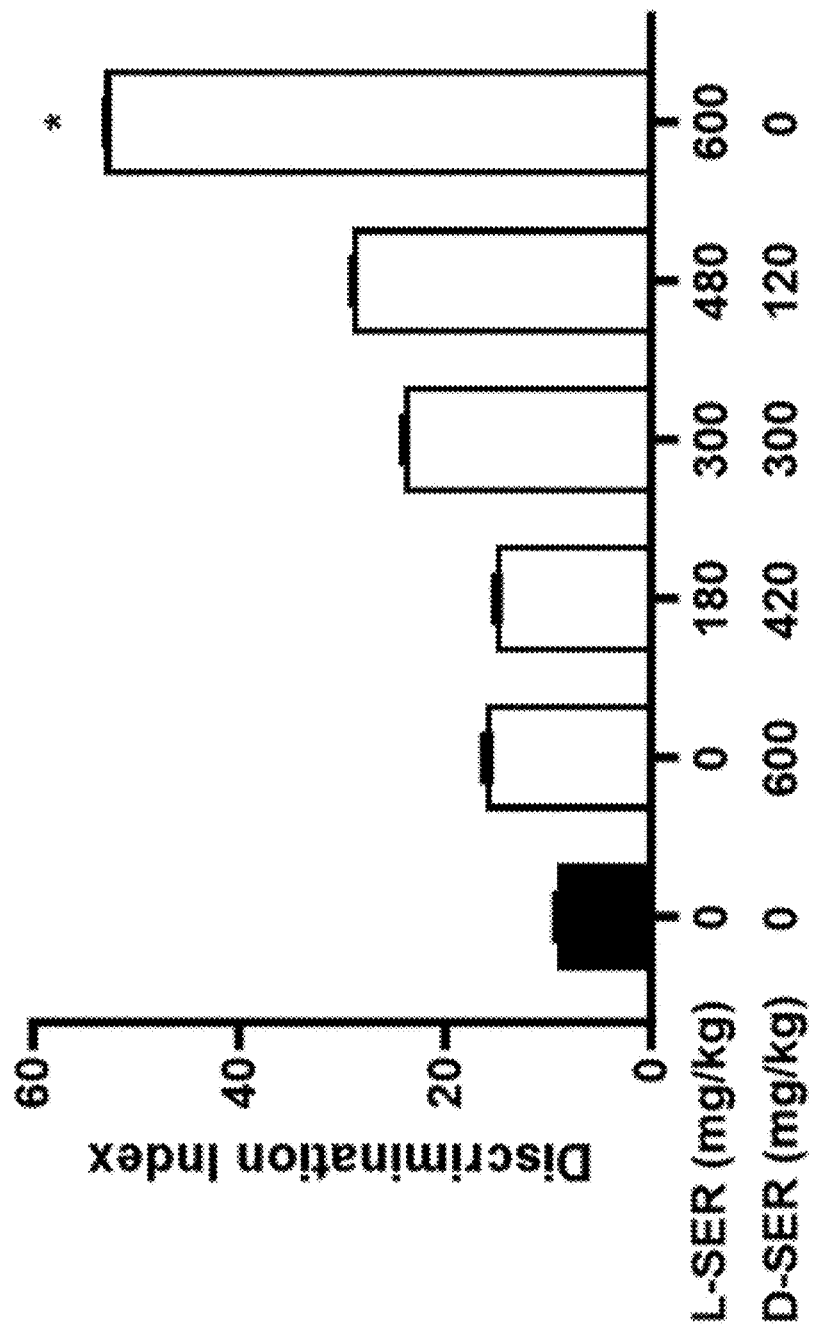
FIG. 6 is a figure that illustrates the difference in spatial working memory for each L-serine administration dosage in the model of autism spectrum disorder.

As the administration dosage of AST-001 increased, the numerical value of the discrimination index (DI), which indicates how much a mouse having autism spectrum disorder recognizes and remembers a novel object, increased (see FIG. 6).

Spatial Memory Experiment

Mice having autism spectrum disorder were created by the same method as in Example 1.1. The 3-week-old male mice having autism spectrum disorder were orally injected with 180, 300, 480, or 600 mg/kg of L-serine for 28 days and then subjected to a spatial memory test. Normal mice were used as a control group. Eight mice were used for each experimental group.

Figure 7:
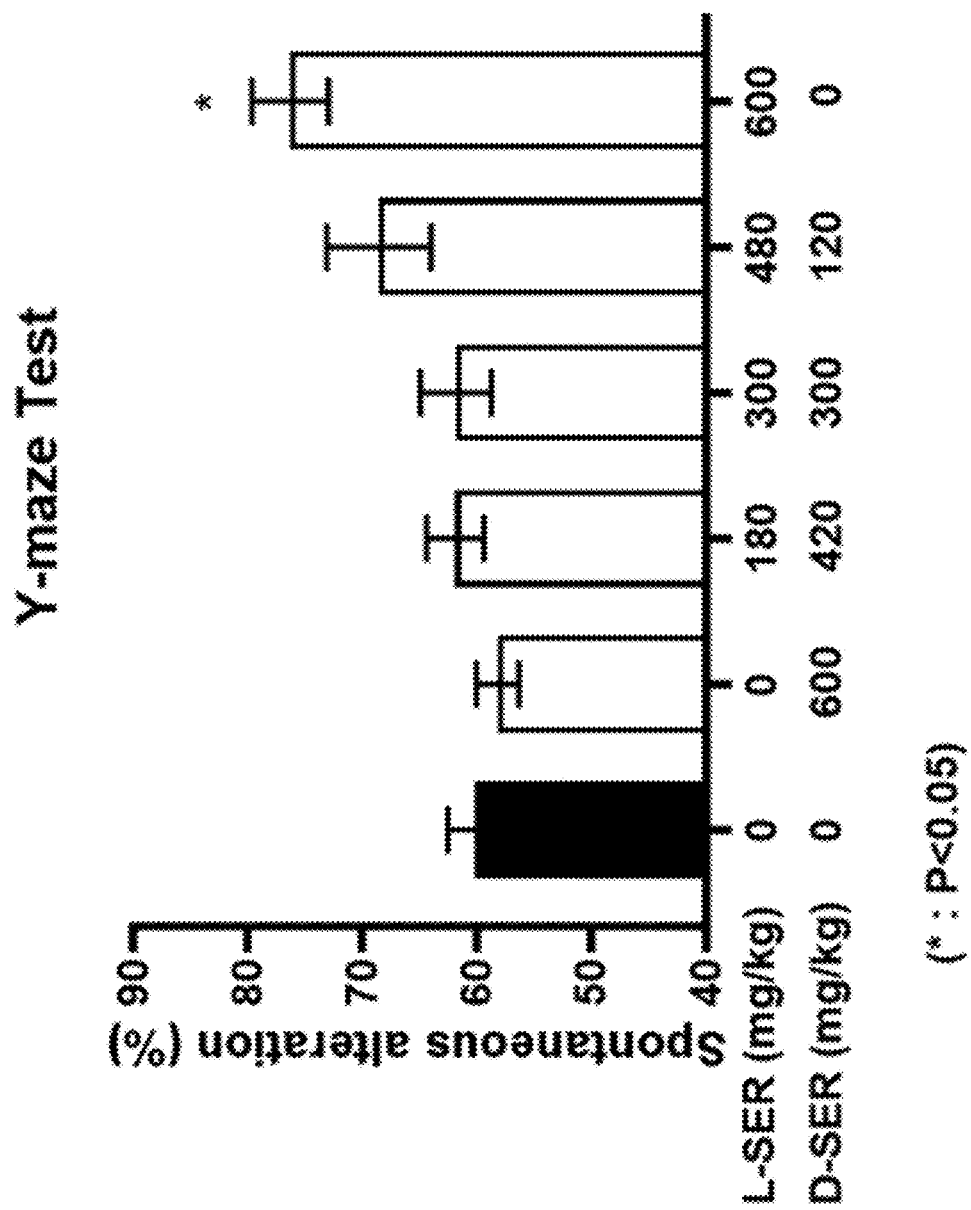
FIG. 7 is a figure that illustrates the differences in individual recognition for each L-serine administration dosage in the model of autism spectrum disorder.

The spatial working memory of the mice was evaluated through the Y-maze test. As the administration dosage of L-serine increased, the value of spontaneous alteration, which is a measure of spatial memory, increased (see FIG. 7).

Example 2. Pharmacokinetic Experiment

Example 2.1. Pharmacokinetic Experiment in Beagle Dog 4 g or 8 g of L-serine was orally or intravenously administered to Beagle dogs (1.8 to 2.6 years old, 8.6 to 11.6 kg, n=20). Blood collection was divided into blood collection before L-serine administration (basal blood collection) and blood collection after administration (main blood collection). During the experiment, the Beagle dogs were maintained in a fasting state, and L-serine concentration in the plasma was analyzed by LC-MS/MS.

Figure 8:
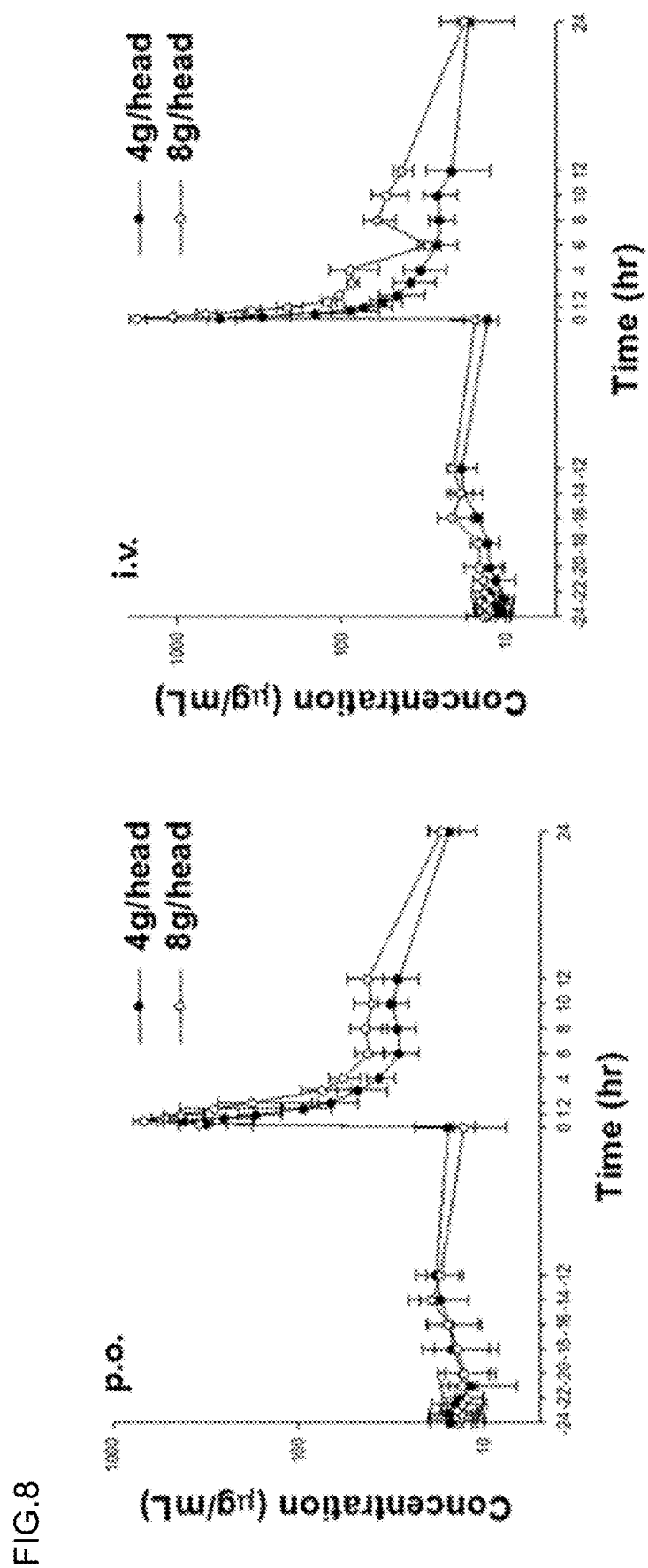
FIG. 8 shows figures that illustrate a plasma concentration-time profile in Beagle dogs that have been injected with L-serine orally or intravenously.

After the oral or intravenous administration of L-serine in Beagle dogs, a plasma concentration-time profile is as shown in FIG. 8.

Areas under the plasma concentration-time curve ($AUC_{inf}$), which had been calculated from the plasma drug concentration curve over time with the oral administration of 4 g or 8 g L-serine, were 627.7±108.4 g hr/mL and 1,329.0±317.8 g hr/mL, respectively, and the drug loss half-lives ($t_{1/2}$) were calculated to be 3.8±1.4 hours and 4.7±1.8 hours, respectively. The bioavailabilities by the oral administration were 106.5% and 84.2% after the administration of 4 g and 8 g per individual, respectively.

Example 2.2. Pharmacokinetic Experiment in Adult Male

Healthy adult males were subjected to a pharmacokinetic experiment with an experimental design as shown in Table 1 below. 24 hours before the administration with AST-001 (main component: L-serine), blood was collected to measure the concentration of L-serine. 60 g of an AST-001 powder is a white homogeneous powder without having foreign substances, divided and repackaged into an HDPE bottle or a bottle made of the same material, and the composition of this drug is such that 1,000 mg of the main component L-serine is comprised per 1,000 mg dose.

TABLE 1

| Group | N | Period 1 | Wash-out | Period 2 |
|---|---|---|---|---|
| 1 | 8 | Single oral administration of 10 g of AST-001 powder | NA | NA |
| 2 | 8 | Single oral administration of 20 g of AST-001 powder | NA | NA |
| 3 | 8 | Single oral administration of 30 g of AST-001 powder | Day 7 | Repeated oral administration twice a day (total; 14 administrations) after single oral administration of 15 g of AST-001 powder once a day |

24 hours before the administration with AST-001, on the whole, the basal L-serine did not show a pattern in which the baseline L-serine changes over time, and no tendency depending on time change during one day was observed. After the single oral administration with 10 g, 15 g, 20 g, or 30 g of AST-001, Cmax, $AUC_{last}$, and $AUC_{inf}$ after systemic exposure to L-serine showed a pattern such that they linearly increased as the administration dosage of AST-001 increased. On the other hand, AST-001 reached a steady state in a case where 15 g was orally administrated repeatedly twice a day for 7 days, and the average half-life turned out to be about 11 hours. In the steady state, the average accumulation index was about 1.7 times with respect to that of the single administration with 15 g of AST-001.

As a result of summarizing the safety evaluations from the adverse events, the clinical laboratory test, the vital signs, the electrocardiogram, the physical examination, and the like, up to 30 g per day in a case of a single oral administration, AST-001 showed excellent safety and drug tolerance in healthy adults in the case where 15 g was orally administrated repeatedly twice a day for 7 days. As a result, it was confirmed that AST-001 can be safely administered within a dose range of 10 to 30 g per day for indications that require repeated administration. The results of the pharmacokinetic analysis in the AST-001 repeated administration test in healthy adult males are as shown in Table 2 below.

TABLE 2

|  | AST-001 15 g (administration for 7 days, twice a day) N = 7 |
|---|---|
| $T_{max}$ (h) | 1.00 |
| $C_{max, ss}$ (μg/mL) | 211.90 ± 56.24 |
| $AUC_{tau, ss}$ (μg*h/mL) | 729.09 ± 202.08 |
| $t_{1/2}$ (h) | 11.01 ± 5.17 |
| $CL_{ss}/F$ (L/h) | 21.97 ± 5.99 |
| Vz/F (L) | 348.05 ± 220.11 |

Tmax: median value,
$C_{max}$, $AUC_{tau}$, $t_{1/2}$, $CL_{ss}/F$, and Vz/F: average value (mean) ± SD Example 2.3. Population Pharmacokinetic Simulation Zero-order absorption with 1-order elimination was applied to the 2-compartmental model to construct a population pharmacokinetic model of AST-001, and a proportional error model was used for the residual model. In the case of the baseline L-serine, it was additionally reflected in the model in a form of injecting L-serine in a steady state. The following pharmacokinetic parameters were reflected in the model by applying allometric scaling to body weight.

$$V1 = V1 \times (\text{body weight}/70)1$$

$$V2 = V2 \times (\text{body weight}/70)1$$

$$Q = Q \times (\text{body weight}/70)0.75$$

$$CL = CL \times (\text{body weight}/70)0.75$$

$AUC_{tau}$ (about 882.8 h*μg/mL) in the steady state after administration according to a 15 g BID usage in a healthy adult was set as the target exposure. A NONMEM version 7.4 program was used for the population pharmacokinetic simulation analysis, and the time of blood collection and L-serine blood concentration data were analyzed using the FOCE INTERACTION option.

In addition, on the whole, the analysis results were such that the baseline L-serine did not show a pattern in which the baseline L-serine changes over time, and the baseline L-serine was consistently detected in a concentration range of 5 to 30 μg/mL. After the single administration with 10 g, 20 g, and 30 g of AST-001, the average $AUC_{last}$ of L-serine without baseline correction was 613.3 h*μg/mL, 1,134.6 h*μg/mL, and 1,525.5 h*μg/mL, respectively, and the average $AUC_{tau}$ of L-serine without baseline correction was 882.8 h*μg/mL in a case where 15 g of AST-001 was administered according to a usage of twice a day for 1 week. The average half-life of L-serine, which had been extrinsically administered using AST-001 was 6.5 to 14.0 hours.

In a case where the dose and usage for each body weight band was simulated, the exposure in the suggested usage of 400 mg/kg or 100 mg/kg was within a difference of 30% of the target $AUC_{tau}$. Considering the drug exposure observed in clinical trials carried out in healthy adults, it was analyzed that an AST-001 administration dosage of 4 g/day to 28 g/day and an AST-001 administration dosage of 400 mg/kg/day exhibit a similar effect in children (see Table 3).

TABLE 3

|  | 400 mg/kg/day | |
|---|---|---|
| Weight | Group | Dose per day (g) |
| 10 to 14 kg | 2 g BID | 4 |
| 15 to 24 kg | 4 g BID | 8 |
| 25 to 37 kg | 7 g BID | 14 |
| 38 to 51 kg | 10 g BID | 20 |
| 52 to 60 kg | 14 g BID | 28 |

Figure 9:
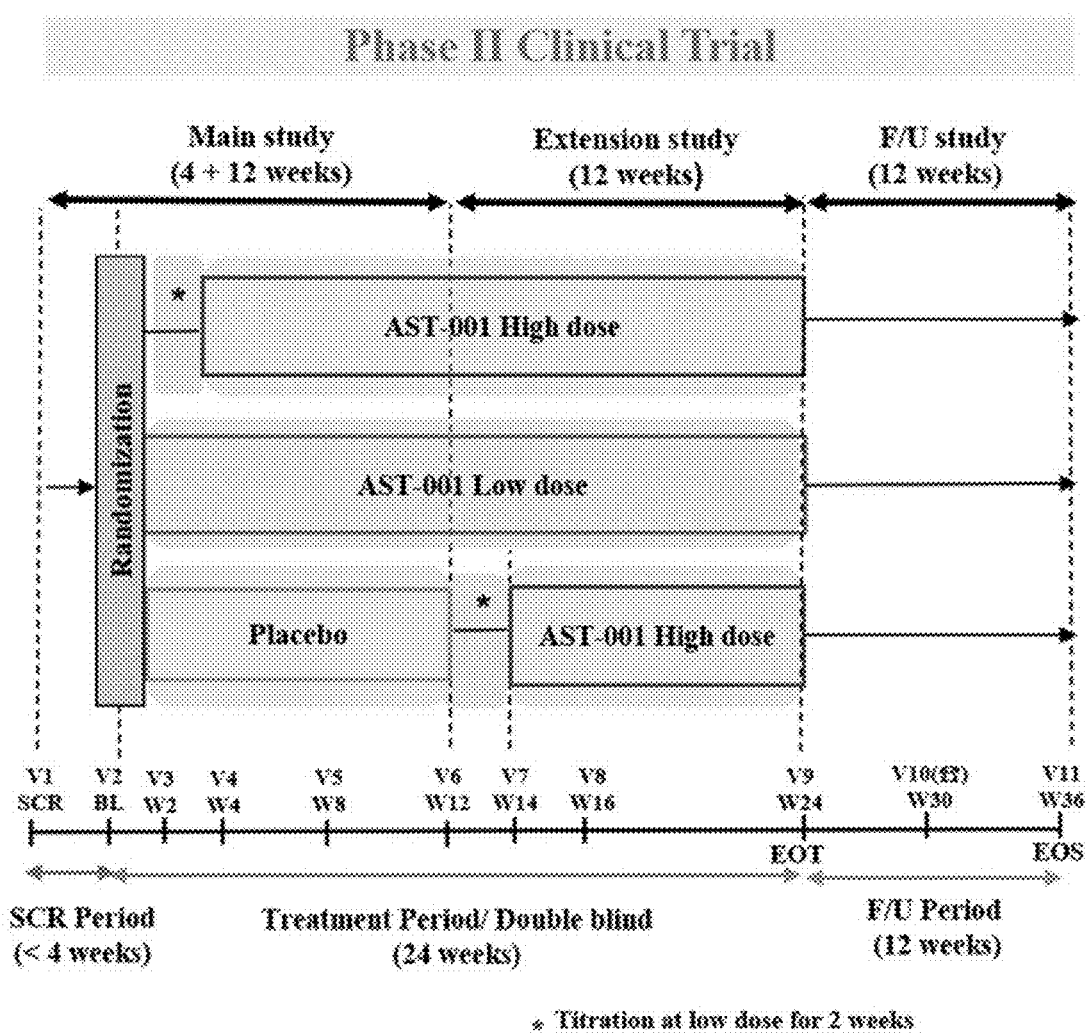
FIG. 9 is a figure that illustrates an outline of a phase 2 clinical trial.

Example 3. Phase 2 Clinical Trial 151 children having autism spectrum disorder were subjected to a multicentered, randomly assigned, double-blinded, placebo-controlled, and therapeutically exploratory phase 2 clinical trial for exploring the effectiveness and evaluating the safety of an AST-001 syrup. The outline of phase 2 clinical trial is as shown in FIG. 9.

An AST-001 syrup used in a clinical trial is a colorless or pale yellow clear syrup which is aromatic and has sweetness, and it comprises, as a main ingredient, 10 g of L-serine in about 100 mL of this drug and is packaged in aluminum foil at a dosage of 2 g/20 mL. The composition of the AST-001 syrup is such that the AST-001 syrup comprises L-serine as a main ingredient, sodium carboxymethyl cellulose as a thickener, methyl paraoxybenzoate and propyl paraoxybenzoate as preservatives, a citric acid hydrate and a potassium citrate hydrate as pH adjusting agents, white sugar and a D-sorbitol solution as sweetening agents, an apple mint flavor SJ-G (22005221) as a fragrance imparting agent, and purified water. As a placebo, a syrup having the same appearance was used. An AST-001 syrup-placebo comprises no main component in 100 mL of this drug, and is produced to have the same composition as the test drug; however, the sweetening agent (white sugar) was additionally added as compared with the test drug in order to exhibit a taste similar to the test drug.

Test subjects who were judged to be suitable to participate in this clinical trial were randomly assigned to a placebo group, a high dose group, and a low dose group at a ratio of 1:1:1 during the administration period (0 to 12 weeks) of the main study, and patients assigned to the high dose group and the low dose group were orally administered with the AST-001 syrup for 12 weeks according to the administration usage and the administration dosage for each body weight, which are described in Table 4. In a case of subjects to be subjected to high dose administration, the subjects were administered, for the first two weeks, at a dose corresponding to the lower dose, and then the dose was increased to a higher dose to check safety.

TABLE 4

| Body weight (kg) | Administration usage | Administration dosage/day (g) | Administration dosage/body weight/day (administration dosage/body weight/administration) |
|---|---|---|---|
| High dose group | | | |
| 10 to 14 | 2 g BID | 4 | 285.7 to 400 mg/kg/day (142.9 to 200 mg/kg/administration) |
| 15 to 24 | 4 g BID | 8 | 333.3 to 533.3 mg/kg/day (166.7 to 266.7 mg/kg/administration) |
| 25 to 37 | 7 g BID | 14 | 378.4 to 560 mg/kg/day (189.2 to 280 mg/kg/administration) |
| 38 to 51 | 10 g BID | 20 | 392.2 to 526.3 mg/kg/day (196.1 to 263.2 mg/kg/administration) |
| 52 to 60 | 14 g BID | 28 | 466.7 to 538.5 mg/kg/day (233.3 to 269.2 mg/kg/administration) |
| Low dose group | | | |
| 10 to 14 | 1 g BID | 2 | 142.9 to 200 mg/kg/day (71.4 to 100 mg/kg/administration) |
| 15 to 24 | 2 g BID | 4 | 166.7 to 266.7 mg/kg/day (83.3 to 133.3 mg/kg/administration) |
| 25 to 37 | 3.5 g BID | 7 | 189.2 to 280 mg/kg/day (94.6 to 140 mg/kg/administration) |
| 38 to 51 | 5 g BID | 10 | 196.1 to 263.2 mg/kg/day (98 to 131.6 mg/kg/administration) |
| 52 to 60 | 7 g BID | 14 | 233.3 to 269.2 mg/kg/day (116.7 to 134.6 mg/kg/administration) |

The control group, which had been administrated with the placebo for 12 weeks as above, was administrated with the AST-001 syrup at the high dose shown in Table 4 for additional 12 weeks of an extension study period (a low dose was administered for the first two weeks to check safety, and then administration was carried out at a high dose), and the group was classified as a high-dose short-term administration group. In the main study, patients, to which AST-001 had been injected at a high dose, were continuously injected with the AST-001 at a high dose and classified as a high-dose long-term administration group. In the main study, patients, to which AST-001 had been injected at a low dose, were continuously injected with the AST-001 syrup at a low dose and classified as a low-dose long-term administration group. After the extension study period of 12 weeks ended, the effectiveness and adverse events in patients were followed up and monitored for 12 weeks (that is, follow-up period).

The baseline features of the patients (FAS population) who have participated in the clinical trial are as described in Table 5.

TABLE 5

| | High dose group (n = 46) | Low dose group (n = 50) | Control group (n = 49) | F or $x^2$ | p-value |
|---|---|---|---|---|---|
| Age, year, average (SD) | 4.8 (1.7) | 5.3 (2.5) | 5.6 (2.2) | 1.83 | 0.164 |
| Sex, male, n (%) | 41 (89.0) | 39 (78.0) | 40 (81.6) | 2.15 | 0.342 |
| Height, cm, average (SD) | 111.8 (12.9) | 114.4 (15.7) | 115.9 (13.3) | 1.07 | 0.345 |
| Body weight, kg, average (SD) | 21.8 (7.4) | 23.3 (10.1) | 24.5 (9.2) | 1.08 | 0.342 |
| Comorbid mental disorder and genetic disorder | | | | | |
| Cognitive disorder, n (%) | 37 (80.4) | 43 (86.0) | 37 (75.5) | 1.75 | 0.416 |
| ADHD, n (%) | 7 (15.2) | 8 (16.0) | 8 (16.3) | 0.02 | 0.988 |
| Tourette syndrome, n (%) | 1 (2.2) | — | — | — | 0.317[a] |
| Fragile X syndrome, n (%) | — | — | 1 (2.0) | — | 0.665[a] |
| History of taking mind control drug | 8 (17.4) | 8 (16.0) | 8 (16.3) | 0.04 | 0.982 |
| History of drug-free treatment | 46 (100.0) | 48 (96.0) | 48 (98.0) | 1.89 | 0.773[a] |
| Score of basal K-VABS-II ABC | 49.9 (9.7) | 50.8 (11.7) | 48.6 (10.6) | 0.52 | 0.594 |
| Score of basal K-VABS-II communication | 52.6 (11.9) | 54.2 (14.0) | 52.6 (11.8) | 0.26 | 0.771 |

TABLE 5-continued

| | High dose group (n = 46) | Low dose group (n = 50) | Control group (n = 49) | F or x² | p-value |
|---|---|---|---|---|---|
| Score of basal K-VABS-II daily living skills | 59.0 (13.3) | 59.2 (13.5) | 57.2 (14.3) | 0.30 | 0.742 |
| Score of basal K-VABS-II sociality | 50.4 (9.5) | 50.4 (10.9) | 47.9 (10.6) | 0.95 | 0.390 |
| Score of basal K-VABS-II motor skills | 67.3 (9.9) | 69.3 (12.7) | 66.9 (10.5) | 0.53 | 0.591 |
| Score of basal K-VABS-II maladaptive behavior | 20.3 (2.0) | 19.9 (2.6) | 20.9 (2.4) | 2.35 | 0.100 |
| Score of basal CGI-S | 5.15 (0.9) | 5.0 (0.9) | 5.0 (1.0) | 0.48 | 0.618 |
| Score of basal SRS-2 (social responsiveness scale-2) Total T-score | 76.0 (8.6) | 75.2 (10.3) | 79.5 (10.3) | 2.69 | 0.072 |
| Score of basal ABC-irritability | 11.5 (6.8) | 11.1 (8.0) | 13.3 (9.2) | 1.02 | 0.364 |
| Score of basal K-PSI-4-SF parental distress | 36.3 (8.5) | 35.1 (7.3) | 36.6 (8.3) | 0.47 | 0.624 |

[a]analyzed by using Fisher's exact test.

Effectiveness

In the phase 2 clinical trial of the AST-001 syrup, the primary effectiveness evaluation variable is an amount of score change in K-VABS-IT ABC with respect to the baseline at the time of 12 weeks after administration. The K-VABS-II is a valid and reproducible assessment tool that evaluates the level of functional adaptation of autism spectrum disorder, where it is composed of four main domains of communication, life skills, sociality, and motor skills, and a maladaptive behavior indicator domain which is selectively carried out. Each item is composed of 3-point Likert scales (0 point: Never, 1 point; Sometimes or partially, and 2 point; Often). The K-VABS-II Adaptive Behavior Composite (K-VABS-II ABC) score, which is a primary evaluation variable, is a calculated score (standard score) for the main domain, where the higher score means the higher level of adaptive behavior. CGI-S is the Ohio State University (OSU) Autism CGI-S Scale, which evaluates overall severity according to 7-point Likert scales (1 point (Normal, not at all ill) to 7 points (Among the most extremely ill patients), where the lower score means the lower severity.

Figure 10:
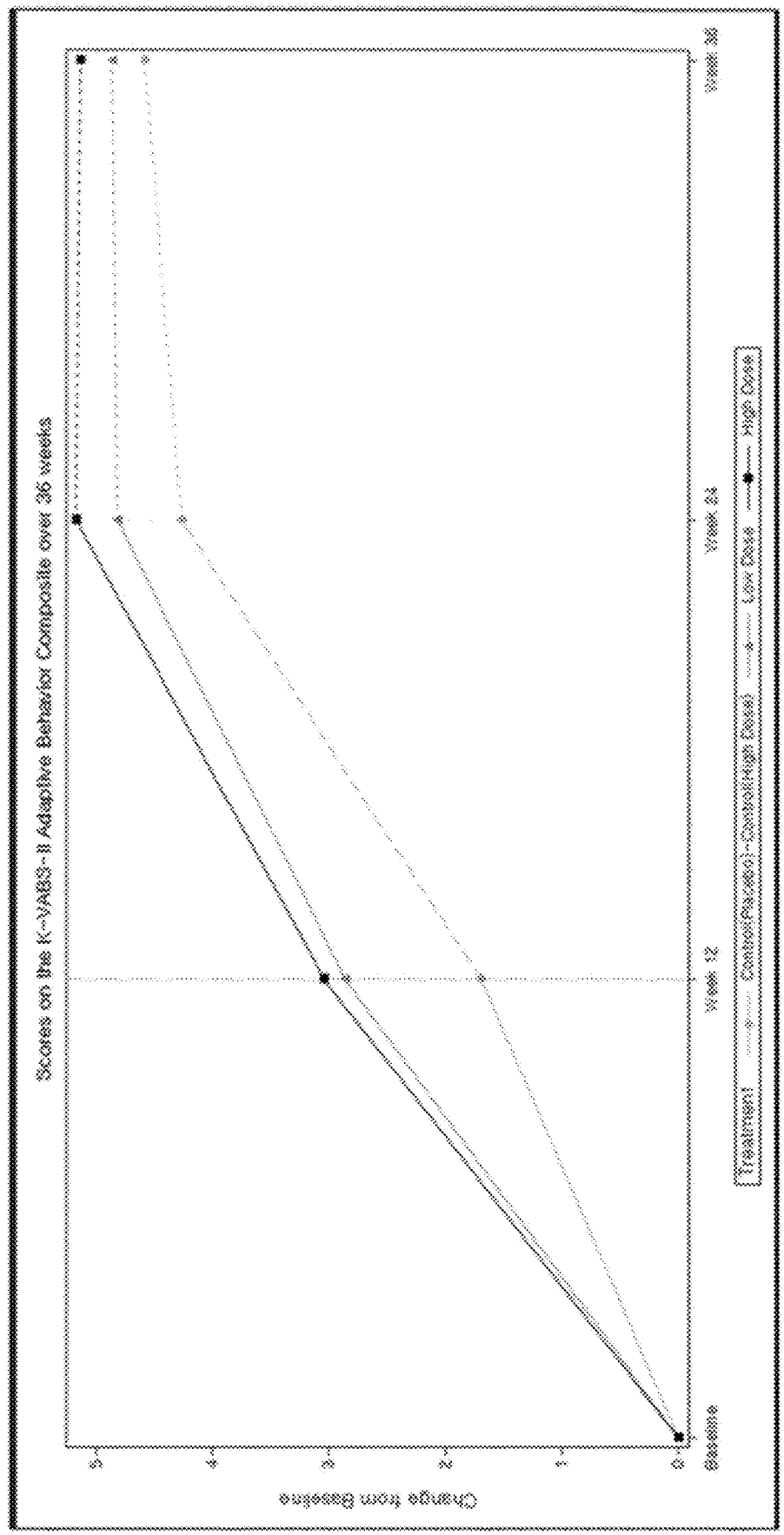
FIG. 10 is a figure that illustrates a tendency (line plot) in three groups for each time regarding an amount of score change in the adaptive behavior composite (hereinafter, referred to as ABC) score according to the Vineland Adaptive Behavior Scale-II (hereinafter, referred to as K-VABS-II) at times of 12 weeks, 24 weeks, and 36 weeks after the start of the clinical trial, with respect to the amount of score change at the time of the start of phase 2 clinical trial.
Figure 11:
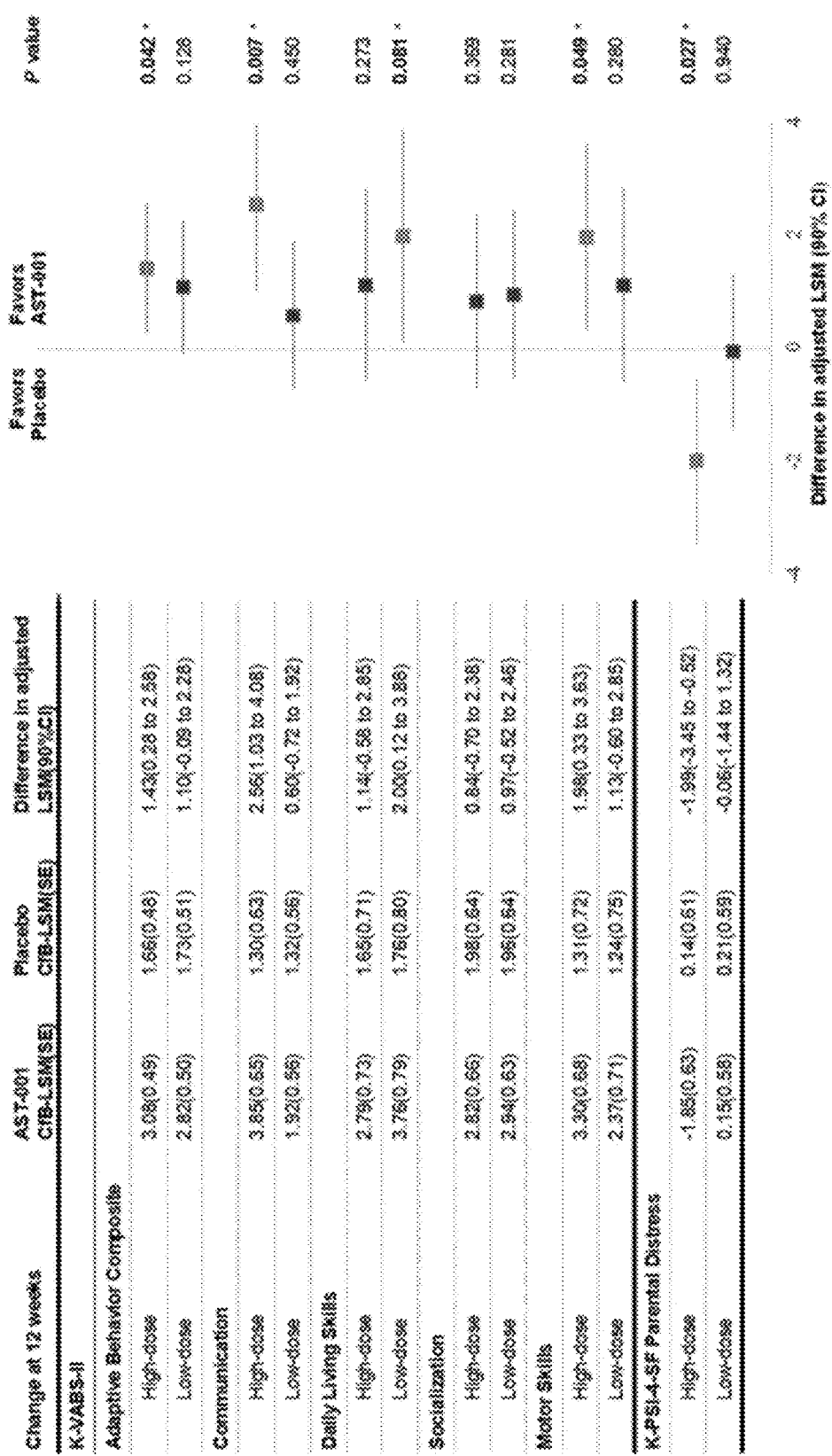
FIG. 11 shows a figure (forest plot) that illustrates, together with 90% confidence intervals and statistical significance, an effect difference (in a FAS population) between treatment groups (a high dose group and a low dose group) with respect to a control group (placebo), regarding the K-VABS-II ABC, the main domain, and the numerical value of the parental distress according to the Korean-Parenting Stress Index—$4^{th}$ Edition Short Form (hereinafter, referred to as K-PSI-4-SF) at the time of 12 weeks after the AST-001 syrup administration, with respect to the effect difference at the time of the start of phase 2 clinical trial.

FIG. 10 shows the amount of score change in the K-VABS-II ABC in the three groups at times of 12 weeks, 24 weeks, and 36 weeks, with respect to the amount of score change at the time of the start of the clinical trial, FIG. 11 shows an effect difference between treatment groups with respect to the control group (placebo) regarding the K-VABS-II ABC, the main domain, and the numerical value of the parental distress according to the K-PSI-4-SF at the time of 12 weeks after the AST-001 syrup administration, and FIG. 12 shows the amount of score change in the K-VABS-II 2DC in the three groups at times of 12 weeks, 24 weeks, and 36 weeks, with respect to the amount of score change at the time of the start of the clinical trial.

Figure 13:
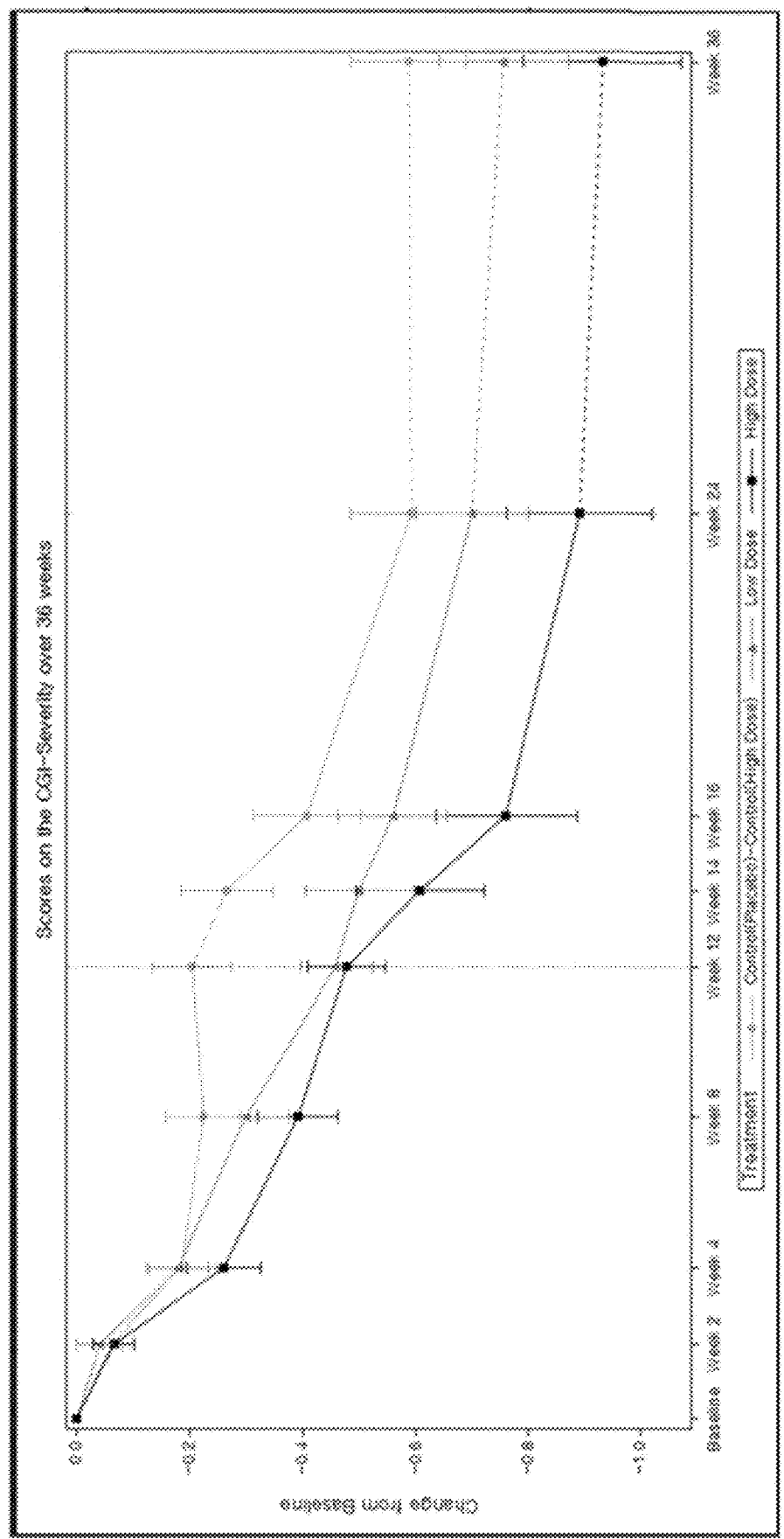
FIG. 13 is a figure that illustrates a tendency (line plot) in three groups for each time regarding an amount of score change (in a FAS population) in the clinical global impression-severity (hereinafter, referred to as CGI-S) at times of 2 weeks, 4 weeks, 8 weeks, 12 weeks, 14 weeks, 16 weeks, 24 weeks, and 36 weeks, with respect to the amount of score change at the time of the start of phase 2 clinical trial.

Further, FIG. 13 shows the amount of score change in the three groups at times of 2 weeks, 4 weeks, 8 weeks, 12 weeks, 14 weeks, 16 weeks, 24 weeks, and 36 weeks, with respect to the amount of score change at the time of the start of phase 2 clinical trial.

All the analysis results were obtained from a full analysis set (FAS) group that included all patients who were administrated with, at least once, a medicinal drug for clinical trial after written consent, from which the effectiveness evaluation variable data were collected at least once after the basal blood collection.

<Analysis of Effectiveness at the Time of 12 Weeks after AST-001 Syrup Administration>

The amount of score change in the K-VABS-II ABC (LS mean±SE) with respect to the baseline at the time of 12 weeks after the AST-001 syrup administration was 1.66±0.48 points in the control group (placebo) and 3.08±0.49 points in the high dose group. The amount of score change in the high dose group increased significantly as compared with the amount of score change in the control group (see FIG. 11), and the difference in the amount of score change was 1.43±0.69 points [90% confidence interval (CI): 0.28, 2.58], which turned out to be at a statistically significant level (p=0.042) (see FIG. 11). Therefore, it was confirmed that the administration of the AST-001 syrup improves the level of functional adaptation to a statistically significant level.

The AST-001 syrup administration improved all of the score of K-VABS-II ABC, the score of the K-VABS-II communication, the score of the K-VABS-II daily living skills, and the score of the K-VABS-II sociality, as well as the score of the K-VABS-II motor skills and the numerical value of the parental distress according to the K-PSI-4-SF (see FIG. 11). In particular, the scores of the K-VABS-II communication and the K-VABS-II motor skill domain improved significantly in the high-dose AST-001 syrup administration group as compared with the control group (p-value: 0.007, p-value: 0.049, see FIG. 11). In addition, the numerical value of the parental distress according to the K-PSI-4-SF was significantly improved in the high-dose AST-001 syrup administration group as compared with the control group (p-value: 0.027, see FIG. 11).

Further, in a case where the amount of score change in the K-VABS-II 2DC was analyzed at the time of 12 weeks after the start of the clinical trial, the amount of change was larger in the low-dose AST-001 syrup administration group and the high-dose AST-001 syrup administration group as compared with the control group (see FIG. 12), which was at a statistically significant level in the high-dose AST-001 syrup administration group as compared with the control group (p-value: 0.026).

In addition, it turned out that the baseline average CGI-S score and the average CGI-S score at 12 weeks of the AST-001 syrup administration, in which the age was reflected, was significantly improved as compared with the control group in both the high dose administration group and the low dose administration group (see FIG. 13). The difference in the amount of score change between the two groups was at a statistically significant level (high dose group vs control group p-value: 0.046, low dose group vs control group p-value: 0.017).

In addition, a small-group effectiveness analysis was carried out based on the age of 7 years or 6 years of the patients who participated in the clinical trial, and the results of the K-VABS-II ABC analysis are as described in Table 6.

TABLE 6

| Treatment group (n) | Baseline | 12 weeks | Amount of change at 12 weeks with respect to baseline | P-value |
|---|---|---|---|---|
| 7 years or younger (2 to 7 years old): 0 to 12 weeks (FAS, N = 124) | | | | |
| Placebo (n = 39) | 50.10 ± 10.20 | 51.36 ± 10.68 | 1.26 ± 3.06 | |
| Low dose (n = 40) | 51.50 ± 12.47 | 54.60 ± 14.09 | 3.10 ± 4.25 | 0.0263 |
| How dose (n = 45) | 50.22 ± 9.49 | 53.29 ± 11.53 | 3.07 ± 3.70 | 0.0170 |
| Less than 7 years old (2 to 6 years old): 0 to 12 weeks (FAS, N = 112) | | | | |
| Placebo (n = 34) | 50.09 ± 10.23 | 51.35 ± 10.34 | 1.26 ± 2.65 | |
| Low dose (n = 38) | 51.89 ± 12.67 | 54.92 ± 14.40 | 3.03 ± 4.35 | 0.0466 |
| How dose (n = 40) | 50.38 ± 9.32 | 53.55 ± 11.42 | 3.18 ± 3.84 | 0.0175 |

As confirmed in Table 6 above, it was analyzed that in the patients 7 years or younger and patients less than 7 years old, to which a high dose of the AST-001 syrup and a low dose of the AST-001 syrup had been injected, the amount of score change in the K-VABS-II ABC at 12 weeks was significantly improved with respect to the basal numerical value as compared with the control group. As a result, it turned out that the effect of ameliorating autism spectrum disorder is high in the patient group of 7 years or younger or less than 7 years, and this suggests that early treatment is effective in ameliorating the disease at the step of the critical stage where synaptic pruning is accomplished.

In addition, a patient population (PPS) which completed the clinical trial without significant violations of the clinical trial protocol was selected among the FAS population, and the PPS population was subjected to the analysis of the amount of score change in the K-VABS-II ABC at the time of 12 weeks, which is the primary effectiveness evaluation variable. In the PPS population, as compared with the high dose group and the control group, the degree of improvement in the low dose group with respect to the control group was more statistically significant than that in the analysis in the FAS population (p-value=0.024; p-value=0.075) (see FIG. 14).

<Analysis of Effectiveness at the Time of 24 Weeks after the AST-001 Syrup Administration>

The extension study period of from 12 weeks to 24 weeks was an interval in which all of the high-dose long-term administration group, the low-dose long-term administration group, and the high-dose short-term administration group were administrated with the AST-001 syrup, and it was confirmed that all the groups show a larger improvement in the amount of score change in the K-VABS-II ABC and the main domain, as well as 2DC and CGI-S, at the time of 12 weeks than at the time of the start of the clinical trial and the time of 24 weeks (see FIG. 10, FIG. 12, and FIG. 13). In particular, in the high-dose short-term administration group administrated with a high dose of AST-001 after 12 weeks of the placebo administration, it was confirmed that the amount of score change in the K-VABS-II ABC and the main domain, as well as 2DC and CGI-S, significantly improves at the time of 24 weeks as compared with at the time of 12 weeks. There was no statistically significant difference between the three groups in the scores of the K-VABS-II ABC and the CGI-S at the time of 24 weeks as compared with those at the time of the start of the clinical trial (p-value=0.555; p-value=0.441).

<Analysis of Effectiveness at the Time of 36 Weeks after the AST-001 Syrup Administration>

On the other hand, the follow-up study period from 24 weeks to 36 weeks after the start of the clinical trial was a period of carrying out follow-up and monitoring, where all of the high-dose long-term administration group, the low-dose long-term administration group, and the high-dose short-term administration group were not administrated with the drug, and there was no statistically significant difference among the three groups in the scores of the K-VABS-II ABC and the CGI-S in the high-dose long-term administration group, the low-dose long-term administration group, and the high-dose short-term administration group (p-value=0.731; p-value=0.611).

However, in a case where the effect of drug discontinuation was followed up and monitored for 12 weeks (that is, 24 to 36 weeks) after the end of the AST-001 syrup administration, the results obtained by carrying out examination for each main domain of the K-VABS-II at the time of 36 weeks showed a tendency such that the effect of drug discontinuation slightly decreases in all the main domain except for the main domain of motor skills, which confirmed that the effectiveness results that show the improvement up to 24 weeks after the administration are due to the effect of the AST-001 syrup.

In addition, in a case where each of the amount of score change in the K-VABS-II ABC and the amount of score change in the CSI-S was analyzed at the time of 36 weeks after the start of the clinical trial, the numerical values of the amount of score change in the K-VABS-II ABC and the amount of score change in the CSI-S were high in the order of the high-dose long-term AST-001 syrup administration group, the low-dose long-term AST-001 syrup administration group, and the high-dose long-short AST-001 syrup administration group, which confirmed that the degree of improvement is high in this order (see FIG. 10 and FIG. 13).

As a result, it was confirmed that the core symptoms of autism spectrum disorder are ameliorated in a case where a pediatric patient having autism spectrum disorder (AST) is subjected to oral administration with the AST-001 syrup at a low dose or a high dose.

Safety

Table 7 shows treatment emergent adverse events (TE-AEs) that have occurred in 5% or more of patients who have participated in the clinical trial.

TABLE 7

| Adverse event | High dose group (N = 50) | Low dose group (N = 51) | Control group (N = 50) | p-value |
|---|---|---|---|---|
| Cough, n (%) | 8 (16.0) | 9 (17.6) | 8 (16.0) | 1.000 |
| Nasopharyngitis | 6 (12.0) | 10 (19.6) | 9 (18.0) | 0.625 |
| Fever | 4 (8.0) | 6 (11.8) | 9 (18.0) | 0.325 |
| Diarrhea | 4 (8.0) | 6 (11.8) | 8 (16.0) | 0.469 |
| COVID-19 | 3 (6.0) | 5 (9.8) | 8 (16.0) | 0.271 |
| Nausea | 2 (4.0) | 5 (9.8) | 5 (10.0) | 0.491 |
| Loss of appetite | 5 (10.0) | 4 (7.8) | 1 (2.0) | 0.281 |
| Constipation | 3 (6.0) | 4 (7.8) | 2 (4.0) | 0.909 |

During the clinical trial period of 36 weeks, the most frequent adverse events were in order of cough, nasopharyngitis, fever, and diarrhea, most adverse events were mild, and it was analyzed that the difference in adverse events between the high dose group, the low dose group, and the control group is a difference that is not statistically significant (p=0.115). Serious adverse events with no causal relationship with the AST-001 syrup occurred in 5 patients (3.3%). Adverse drug reactions (ADRs) associated with the AST-001 syrup were reported in 12 patients (24.0%) in the control group, 6 patients (11.8%) in the low dose group, and 7 patients (14.0%) in the high dose group, and it was analyzed that there was no statistically significant difference between these groups (p=0.209).

In summary, the AST-001 syrup administration turned out to have excellent safety and excellent drug tolerance while having an excellent effect of ameliorating symptoms of autism spectrum disorders such as troubles in communication and motor skills, as compared with the control group. In addition, the high-dose short-term administration group, which had been administered with the AST-001 syrup at a high dose after 12 weeks of the placebo administration, showed a level of development similar to those of the low-dose long-term administration group and the high-dose long-term treatment group. Further, it turned out that as compared with the control group, parenting stress is ameliorated in the AST-001 syrup administration group through the improvement of the subdomain of the parental distress according to the K-PSI-4-SF in the AST-001 syrup group as compared with the control group. As a result, it was confirmed that the AST-001 syrup administration can ameliorate the core symptoms of autism spectrum disorder and can also ameliorate the stress of parents who care for patients having autism spectrum disorder.

Figure 15:
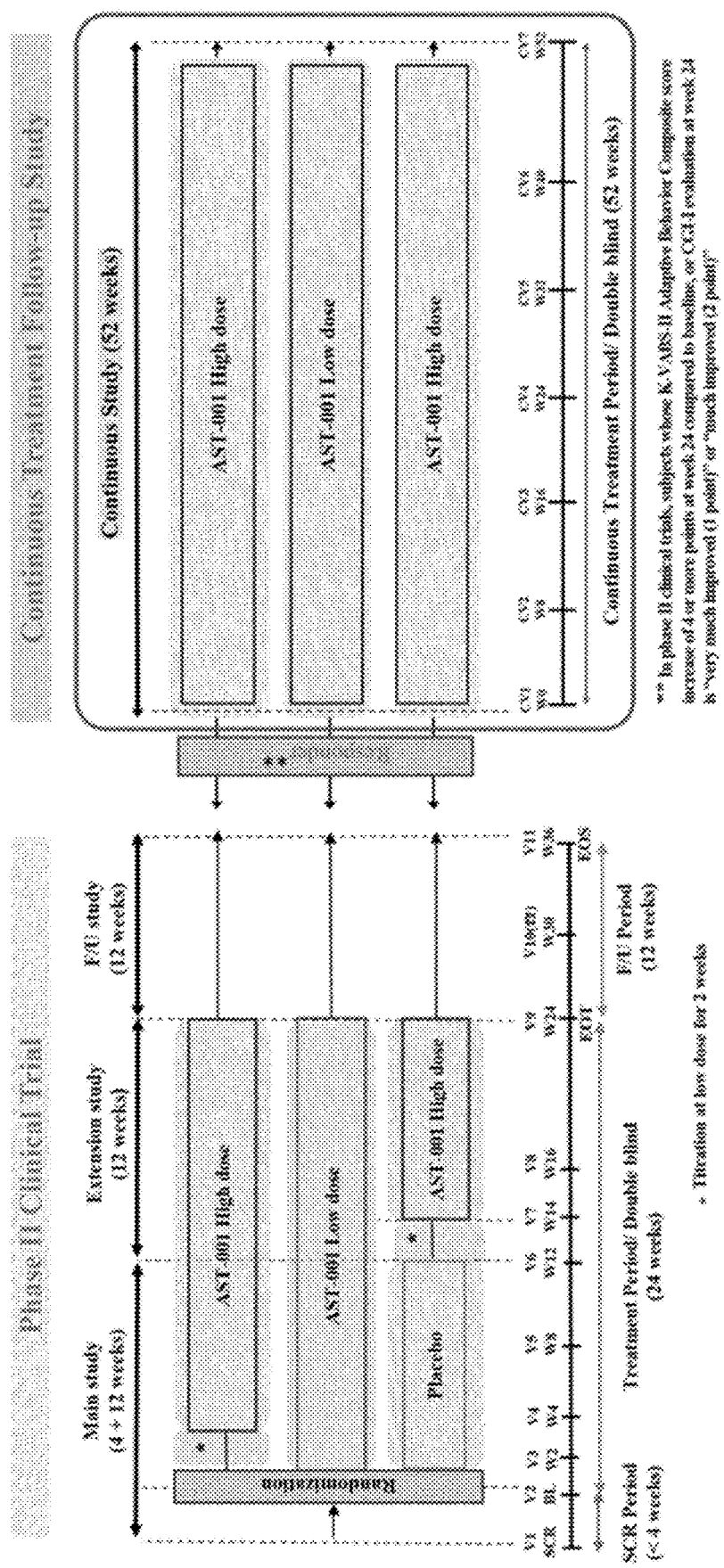
FIG. 15 is a figure that illustrates an outline of a clinical trial of a 52-week continuous administration.

Example 4. Clinical Trial of 52-Week Continuous Administration 61 patients who were willing to participate in a clinical trial of continuous administration were selected from 75 responders who showed a therapeutic response to the AST-001 syrup and had completed the phase 2 clinical trial of Example 3. Each responder was administered with a drug for up to 52 weeks, and the outline of the clinical trial is shown in FIG. 15.

The responders are patients in which the score of the K-VABS-II ABC with respect to the baseline at the time of 24 weeks (end of treatment, EOT) after administration has increased by 4 points or more in the phase 2 clinical trial, or patients in which the degree of global improvement CGI-Improvement (hereinafter, referred to as CGI-I) at the time of 24 weeks (EOT) is 1 point (very much improved) or 2 points (much improved). The CGI-I is the OSU Autism CGI-I Scale, which is composed of 7 Likert scales (1 point: Very much improved to 7 points: Very much worse). It means the global improvement with respect to the baseline visit in the phase 2 clinical trial, where a lower score means a higher degree of improvement. The selected responders were assigned to one of the administration groups described in Table 8, and in this case, the high-dose administration amount of the AST-001 syrup and the low-dose administration amount of the AST-001 syrup are the doses described in Table 4.

TABLE 8

| Administration group assigned in phase 2 clinical trial | Usage |
|---|---|
| High-dose long-term administration group | AST-001 syrup, high dose |
| Low-dose long-term administration group | AST-001 syrup, low dose |
| High-dose short-term administration group | AST-001 syrup, high dose |

The baseline states of patients at the time of the start of the clinical trial of the 52-week continuous administration are as described in Table 9 below, and there was no statistically significant difference between the low dose group and the high dose group in terms of age, sex, rate of comorbid mental disorders, and basal CGI-S.

TABLE 9

| | | Low dose group (n = 21) | High dose group (n = 40) | Total group (n = 61) | P-value |
|---|---|---|---|---|---|
| Age | Years, average ± Std | 6.57 ± 2.64 | 6.05 ± 1.99 | 6.23 ± 2.22 | P = 0.3888 |
| Sex | Male, N (%) | 15 (71.43) | 33 (82.50) | 48 (78.69) | P = 0.3407 |
| | Female, N (%) | 6 (28.57) | 7 (17.50) | 13 (21.31) | |
| Comorbid mental disorder | Intellectual disability, N (%) | 19 (90.48) | 33 (82.50) | 52 (85.25) | N/A |
| | ADHD, N (%) | 4 (19.05) | 9 (22.50) | 13 (21.31) | N/A |
| Basal CGI-S | At time of start of clinical trial of 52-week continuous administration, average ± Std | 4.29 (0.72) | 4.23 (0.95) | 4.25 (0.87) | P = 0.7979 |
| | At completion of phase 2 clinical trial, average ± Std | 4.86 (0.79) | 4.93 (0.89) | 4.90 (0.85) | P = 0.7700 |

Effectiveness

The CGI-S average score and the amount of score change in the CGI-S with respect to the baseline, which were measured at the time of the start of the clinical trial of the 52-week continuous administration (that is, baseline), 8 weeks, 16 weeks, 24 weeks, 32 weeks, 40 weeks, and 52 weeks, is described in Table 10.

TABLE 10

| Administration group | Average score of CGI-S in continuous administration clinical trial (Mean ± Std) | | | | | | |
|---|---|---|---|---|---|---|---|
| | Baseline | 8 weeks | 16 weeks | 24 weeks | 32 weeks | 40 weeks | 52 weeks |
| Low dose group (n = 21) | 4.29 ± 0.72 | 4.19 ± 0.75 | 4.19 ± 0.75 | 4.14 ± 0.65 | 4.14 ± 0.65 | 4.14 ± 0.65 | 4.14 ± 0.65 |
| High dose group (n = 4) | 4.23 ± 0.95 | 4.15 ± 0.83 | 4.15 ± 0.83 | 4.10 ± 0.84 | 4.10 ± 0.84 | 4.10 ± 0.84 | 4.08 ± 0.86 |
| Total (n = 61) | 4.25 ± 0.87 | 4.16 ± 0.80 | 4.16 ± 0.80 | 4.11 ± 0.78 | 4.11 ± 0.78 | 4.11 ± 0.78 | 4.10 ± 0.79 |

| Administration group | Amount of score change in CGI-S in continuous administration clinical trial (Mean ± Std) | | | | | | |
|---|---|---|---|---|---|---|---|
| | N/A | 8 weeks | 16 weeks | 24 weeks | 32 weeks | 40 weeks | 52 weeks |
| Low dose group (n = 21) | N/A | −0.10 ± 0.30 | −0.10 ± 0.30 | −0.14 ± 0.36 | −0.14 ± 0.36 | −0.14 ± 0.36 | −0.14 ± 0.36 |
| High dose group (n = 40) | | −0.08 ± 0.42 | −0.08 ± 0.42 | −0.13 ± 0.46 | −0.13 ± 0.46 | −0.13 ± 0.52 | −0.15 ± 0.48 |
| Total (n = 61) | | −0.08 ± 0.38 | −0.08 ± 0.38 | −0.13 ± 0.43 | −0.13 ± 0.43 | −0.13 ± 0.46 | −0.15 ± 0.44 |

Figure 16:
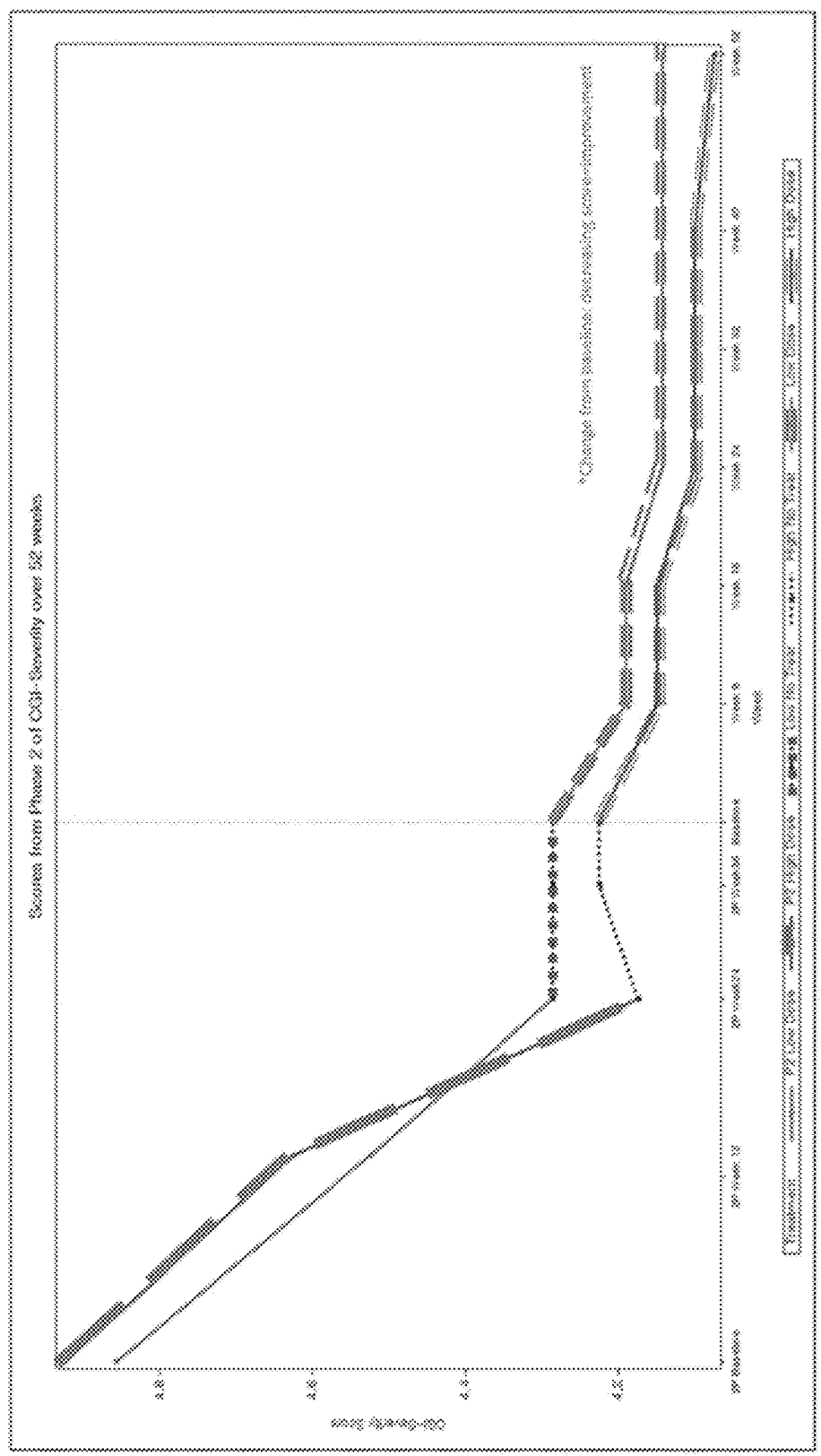
FIG. 16 is a figure that illustrates, in patients who have participated in the clinical trial of the 52-week continuous administration, a tendency (line plot) of the CGI-S score (in a FAS population) in two groups for each time from the time of the start of phase 2 clinical trial to the time of the completion of the clinical trial of the 52-week continuous administration.

Further, from the time of the start of phase 2 clinical trial to the time of the completion of the clinical trial of the 52-week continuous administration, the tendencies of the CGI-S score and the amount of score change in the CGI-S for each group of the patients who participated in the clinical trial of the 52-week continuous administration are shown in FIG. 16 and FIG. 17, respectively.

Both the low dose group and the high dose group showed a tendency such that the CGI-S was improved during the period of the clinical trial of the 52-week continuous administration, and it turned out that the level of improvement is high in the high dose group as compared with the low dose group. As the CGI-S score (severity) of the low dose group was higher at point of the baseline in the test of continuous administration, the low dose group showed a somewhat larger change than the high dose group until the intermediate point; however, at the time of the completion of the continuous administration (52 weeks), the high dose group showed a higher improvement than the low dose group. In addition, in the high dose group, a high improvement was exhibited until the end of the 24-week administration (EOT) in the phase 2 clinical trial. Then, the effect once worsened up to a point of the baseline in the test of continuous administration, the point being the time of discontinuation of administration, and then it was maintained together with a decrease in severity again when the AST-001 syrup was re-administered, and an effect of additional improvement was exhibited at 52 weeks.

The CGI-I average score and the CGI-I response rate (a proportion of responders having a CGI-I score of 1 or 2), which were measured at the time of the start of the clinical trial of the 52-week continuous administration (that is, baseline), 8 weeks, 16 weeks, 24 weeks, 32 weeks, 40 weeks, and 52 weeks, are described in Table 11 below.

TABLE 11

| Administration group | Baseline | 8 weeks | 16 weeks | 24 weeks | 32 weeks | 40 weeks | 52 weeks |
|---|---|---|---|---|---|---|---|
| | Score of CGI-I in continuous administration clinical trial (Mean ± Std) | | | | | | |
| Low dose group (n = 21) | 2.19 ± 0.40 | 2.10 ± 0.44 | 2.14 ± 0.57 | 2.19 ± 0.60 | 2.14 ± 0.48 | 2.14 ± 0.48 | 2.14 ± 0.48 |
| High dose group (n = 40) | 2.30 ± 0.61 | 2.20 ± 0.52 | 2.20 ± 0.52 | 2.18 ± 0.55 | 2.18 ± 0.55 | 2.13 ± 0.56 | 2.13 ± 0.56 |
| Total (n = 61) | 2.26 ± 0.54 | 2.16 ± 0.49 | 2.18 ± 0.53 | 2.18 ± 0.56 | 2.16 ± 0.52 | 2.13 ± 0.53 | 2.13 ± 0.53 |
| | Response in CGI-I evaluation in continuous administration clinical trial (N, %) | | | | | | |
| Low dose group (n = 21) | 17 (80.95) | 18 (85.71) | 18 (85.71) | 17 (80.95) | 17 (80.95) | 17 (80.95) | 17 (80.95) |
| High dose group (n = 40) | 29 (72.50) | 32 (80.00) | 32 (80.00) | 32 (80.00) | 32 (80.00) | 33 (82.50) | 33 (82.50) |
| Total (n = 61) | 46 (75.41) | 50 (81.97) | 50 (81.97) | 49 (80.33) | 49 (80.33) | 50 (81.97) | 50 (81.97) |

At the point of the baseline in the test of continuous administration for 52 weeks, the CGI-I score was low in the low dose group as compared with the high dose group. In contrast, at the time of 52 weeks, the results were such that the CGI-I score was low in the high dose group as compared with the low dose group, and thus it turned out that the degree of improvement during the test of continuous administration was large in the high dose group as compared with the low dose group. In addition, both the low dose group and the high dose group showed a score of 2 points or more and less than 3 points, indicating improvement in the CGI-I evaluation at all times in the test of continuous administration, and thus an effect of improvement on the long-term administration was exhibited.

In addition, 43 subjects out of the 48 subjects for evaluating the CGI-I response at the time of 24 weeks in the phase 2 clinical trial continued to respond in the CGI-I evaluation at the point of the baseline in the test of continuous administration, and about 90% of the subjects maintained the effect of improvement in terms of CGI-I in the phase 2 clinical trial, and it turned out that about 94% of the subjects continues to respond in the CGI-I evaluation until the time of the end of the clinical trial of the 52-week continuous administration.

Further, in a case where the ages of patients who participated in the clinical trial were classified into the age of 8 years or older or 7 years or younger to analyze the effectiveness due to the administration of the AST-001 syrup administration, the degree of improvement in the CGI-S with respect to the baseline in the phase 2 clinical trial turned out to be high in a subject group of 7 years or older as compared with a subject group of 8 years or older (see Table 12).

TABLE 12

|  | 8 weeks | 16 weeks | 24 weeks | 32 weeks | 40 weeks | 52 weeks |
| --- | --- | --- | --- | --- | --- | --- |
| 7 years or younger, amount of score change in CGI-S with respect to baseline in phase 2 clinical trial (Mean ± Std) | | | | | | |
| Low dose (n = 14) | −0.71 ± 0.61 | −0.71 ± 0.61 | −0.79 ± 0.70 | −0.79 ± 0.70 | −0.79 ± 0.70 | −0.79 ± 0.70 |
| How dose (n = 33) | −0.79 ± 0.74 | −0.79 ± 0.74 | −0.82 ± 0.77 | −0.82 ± 0.77 | −0.79 ± 0.78 | −0.82 ± 0.77 |
| Total (n = 47) | −0.77 ± 0.70 | −0.77 ± 0.70 | −0.81 ± 0.74 | −0.81 ± 0.74 | −0.79 ± 0.75 | −0.81 ± 0.74 |
| 8 years or older, amount of score change in CGI-S with respect to baseline in phase 2 clinical trial (Mean ± Std) | | | | | | |
| Low dose (n = 7) | −0.57 ± 0.53 | −0.57 ± 0.53 | −0.57 ± 0.53 | −0.57 ± 0.53 | −0.57 ± 0.53 | −0.57 ± 0.53 |
| How dose (n = 7) | −0.71 ± 0.76 | −0.71 ± 0.76 | −0.86 ± 0.69 | −0.86 ± 0.69 | −1.00 ± 0.58 | −1.00 ± 0.58 |
| Total (n = 14) | −0.64 ± 0.63 | −0.64 ± 0.63 | −0.71 ± 0.61 | −0.71 ± 0.61 | −0.79 ± 0.58 | −0.79 ± 0.58 |

In addition, the degree of improvement in the CGI-I at the time of 52 weeks in the continuous administration turned out to be high in a subject group of 7 years or younger as compared with a subject group of 8 years or older (see Table 13).

TABLE 13

|  | Baseline | 8 weeks | 16 weeks | 24 weeks | 32 weeks | 40 weeks | 52 weeks |
| --- | --- | --- | --- | --- | --- | --- | --- |
| 7 years or younger, score of CGI-I at each time for each age group (Mean ± Std) | | | | | | | |
| Low dose (n = 14) | 2.14 ± 0.36 | 2.00 ± 0.39 | 2.00 ± 0.39 | 2.07 ± 0.47 | 2.07 ± 0.47 | 2.07 ± 0.47 | 2.07 ± 0.47 |
| How dose (n = 33) | 2.33 ± 0.65 | 2.21 ± 0.55 | 2.21 ± 0.55 | 2.18 ± 0.58 | 2.18 ± 0.58 | 2.15 ± 0.62 | 2.15 ± 0.62 |
| Total (n = 47) | 2.28 ± 0.58 | 2.15 ± 0.51 | 2.15 ± 0.51 | 2.15 ± 0.55 | 2.15 ± 0.55 | 2.13 ± 0.58 | 2.13 ± 0.58 |
| 8 years or older, score of CGI-I at each time for each age group (Mean ± Std) | | | | | | | |
| Low dose (n = 7) | 2.29 ± 0.49 | 2.29 ± 0.49 | 2.43 ± 0.79 | 2.43 ± 0.79 | 2.29 ± 0.49 | 2.29 ± 0.49 | 2.29 ± 0.49 |
| How dose (n = 7) | 2.14 ± 0.38 | 2.14 ± 0.38 | 2.14 ± 0.38 | 2.14 ± 0.38 | 2.14 ± 0.38 | 2.00 ± 0.00 | 2.00 ± 0.00 |
| Total (n = 14) | 2.21 ± 0.43 | 2.21 ± 0.43 | 2.29 ± 0.61 | 2.29 ± 0.61 | 2.21 ± 0.43 | 2.14 ± 0.36 | 2.14 ± 0.36 |

In other words, in terms of the amount of score change in the CGI-S and the CGI-J average score with respect to the baseline in the phase 2 clinical trial, it turned out that the effect of ameliorating autism spectrum disorder is high in the patient group of 7 years or younger as compared with the patient group 8 years or older, and this suggests that early treatment is effective in ameliorating the disease at the step of the critical stage where synaptic pruning is accomplished.

Safety

There were no serious adverse events and no deaths, which had been evaluated to be related to AST-001 in the adverse events reported during the clinical trial of the 52-week continuous administration, and the COVID-19 infection was reported as the most frequent adverse event (5 events in the low dose group and 6 events in the high dose group) out of a total of 41 TEAEs since the clinical trial of the 52-week continuous administration was carried out in a state where the COVID-19 was pandemic (see Table 14 below).

TABLE 14

| | Low dose group (n = 21) | | High dose group (n = 40) | | Total group (n = 61) | |
|---|---|---|---|---|---|---|
| | N (%) | Events | N (%) | Events | N (%) | Events |
| Adverse event [TEAE] | 12 (57.14) | 16 | 13 (32.50) | 25 | 25 (40.98) | 41 |
| Adverse drug reaction [ADR] | 1 (4.76) | 1 | 1 (2.50) | 1 | 2 (3.28) | 2 |

In addition, a total of two adverse drug reactions (ADRs) were Grade 1 (mild) adverse events, and they were confirmed to be 'recovered' after the adverse events. As a result, it turned out that for a maximum period of 52 weeks of the period of continuous administration, a safe administration is possible without the discontinuation of administration to pediatric patients having autism spectrum disorder.

In summary, the AST-001 syrup could be safely administered to a pediatric patient having autism spectrum disorder even in the case of long-term administration, the effectiveness tended to be improved as the period of continuous administration was lengthened. In addition, it was also confirmed that not only the therapeutic responses shown in the phase 2 clinical trial are, on the whole, sustained, but also an effect of additional improvement due to long-term administration is obtained.

Example 5. Usage/Dose Modeling Analysis in Phase 3 Clinical Trial

Considering that one package of the AST-001 syrup used in the clinical trial was a 2 g/20 mL formulation, a modeling analysis was carried out to evaluate whether the effect confirmed in the phase 2 clinical trial was exhibited even in a case where the single administration dosage for each body weight band was set to an administration dosage of an even number of packages in order to increase of ease of administration to children.

For the modeling analysis, a population pharmacokinetic/pharmacodynamic model was constructed using the clinical trial data obtained from the clinical trial on the healthy adult males in Example 2.2 and phase 2 clinical trial of Example 3. For the population pharmacokinetic/pharmacodynamic analysis of AST-001, the Monolix program (version 2021R1) was used, and for the parameter estimation, the analysis was carried out with the stochastic approximation expectation maximization algorithm method by using the time of clinical trial and the KVABS-II-ABC score data according to the clinical trial protocol of Example 2.2 and Example 3. In the model constructed in Example 2.3, a model in which the production of endogenous L-serine was removed was used as a population pharmacokinetic model. A turn-over model, an effect compartment model, and a direct model were explored for the pharmacodynamic models, and a linear model and an Emax model were explored for the drug effect. Constant, linear, and exponential models were explored for a time-dependent pattern of score change in the K-VABS-II-ABC, including the placebo group.

A final pharmacokinetic/pharmacodynamic model was used to carry out a simulation analysis which predicts the pattern of the K-VABS-II-ABC score in a case where AST-001 is administered for 12 weeks for each body weight band according to several scenarios.

Simulx (version 2021R1) was used for the simulation analysis, and data of 1,000 to 1,200 children in an age band of 2 to 12 years old were generated and analyzed using the 'httk' package of the R software. Weight-based dosages 1, 3, and 4 of the simulation scenario were analyzed using data from 1,000 virtual pediatric patients, and a weight-based dosage 2 was analyzed using data from 1,200 virtual pediatric patients. A search was carried out for the ratio (=target attainment) of subjects having an increased amount of score change in the KVABS-II-ABC by 2 points or more at the time of 12 weeks, and then a dose in a scenario in which a target attainment similar to that in the usage for each body weight band with which administration was carried out in the phase 2 clinical trial was expected to be the dose that provides ease of administration and exhibits the effect confirmed in the phase 2 clinical trial.

[Population Pharmacokinetic/Pharmacodynamic Analysis Results]

The pharmacodynamic pattern of the AST-001 syrup was adequately described by a model in which the drug effect was linearly exhibited according to the effect site concentration, and regardless of drug administration, the change in the K-VABS-II-ABC score was included in a linear progression model. The final model was analyzed to adequately predict the pharmacodynamic pattern after the AST-001 syrup administration through GOF and VPC.

[Simulation Analysis Results]

In a case where the results obtained by administering the AST-001 syrup for 12 weeks according to the BID usage according to the several scenarios adopted were compared with the simulation results of the usage for each body weight band with which administration was carried out in the phase 2 clinical trial, the results from the weight-based dosage 4 scenario reached the target effectiveness most similarly, and the analysis results in this case, which was obtained by predicting the pattern of the K-VABS-II-ABC score at 12 weeks, are shown in FIG. 18.

Specifically, the amount of score change (median value) in the K-VABS-II-ABC at 12 weeks with respect to 0 weeks was predicted to be 1.67 to 3.74 in the AST-001 syrup treatment group, and it was predicted to be 0.92 to 1.15 in the placebo group (see FIG. 18). In addition, in a case where 2 g BID was administered in the body weight band of 10 to 13 kg, the ratio (target attainment) of pediatric patients having an increased amount of score change in the K-VABS-II-ABC by 2 points or more was 40.5%, which was 2.1 times that of the placebo group. In addition, in other body weight bands as well, the target attainment ratio was confirmed to be 1.8 to 2.7 times higher in the AST-001 syrup treatment group than in the placebo group (see FIG. 18).

Therefore, considering the ease of administration in children and the effect of the AST-001 syrup, it was analyzed that the AST-001 syrup exhibits clinically significant efficacy as compared with placebo in a case of being administered at the administration dosage for each body weight band which is described in Table 15 below.

TABLE 15

| | AST-001 syrup administration group | | |
|---|---|---|---|
| Body weight (kg) | Administration usage | Administration dosage/day (g) | Administration dosage/body weight/day (administration dosage/body weight/administration) |
| 10 to 13 | 2 g BID | 4 | 307.7 to 400 mg/kg/day (153.8 to 200 mg/kg/administration) |
| 14 to 20 | 4 g BID | 8 | 400 to 571.4 mg/kg/day (200 to 285.7 mg/kg/administration) |
| 21 to 34 | 6 g BID | 12 | 352.9 to 571.4 mg/kg/day (176.5-285.7 mg/kg/administration) |
| 35 to 49 | 10 g BID | 20 | 408.2 to 571.4 mg/kg/day (204.1 to 285.7 mg/kg/administration) |
| 50 | 14 g BID | 28 | 560 mg/kg/day (280 mg/kg/administration) |
| 60 | 14 g BID | 28 | 466.7 mg/kg/day (233.3 mg/kg/administration) |
| 70 | 14 g BID | 28 | 400 mg/kg/day (200 mg/kg/administration) |
| 80 | 14 g BID | 28 | 350 mg/kg/day (175 mg/kg/administration) |
| 90 | 14 g BID | 28 | 311.1 mg/kg/day (155.6 mg/kg/administration) |
| 100 | 14 g BID | 28 | 280 mg/kg/day (140 mg/kg/administration) |
| 100 or more | 14 g BID | 28 | |

The invention claimed is:

1. A method for treating a disease selected from communication disorder, abnormal motor ability, cognitive disorder, mental disorder, sensory disturbance, autism spectrum disorder, and pervasive developmental disorder in an individual having the disease, wherein the method comprises a step of administering an effective amount of L-serine or a pharmaceutically acceptable salt thereof to the individual, and wherein the individual is 7 years old or younger.

2. The method for treating a disease according to claim 1, wherein a total daily administration dosage of the L-serine or the pharmaceutically acceptable salt thereof is 2 g to 28 g.

3. The method for treating a disease according to claim 1, wherein a total daily administration dosage of the L-serine or the pharmaceutically acceptable salt thereof is 140 mg/kg to 580 mg/kg.

4. The method for treating a disease according to claim 1, wherein a single administration dosage of the L-serine or the pharmaceutically acceptable salt thereof is 70 mg/kg to 280 mg/kg.

5. A method for treating autism spectrum disorder in an individual having a clinical global impression-severity (CGI-S) score of 5 or higher, wherein the method comprises a step of administering an effective amount of L-serine or a pharmaceutically acceptable salt thereof to the individual.

6. A method for treating an individual with autism spectrum disorder to improve communication ability and/or socialization, wherein the method comprises a step of administering an effective amount of L-serine or a pharmaceutically acceptable salt thereof to the individual.

7. The method for treating a disease according to claim 5, wherein a total daily administration dosage of the L-serine or the pharmaceutically acceptable salt thereof is 2 g to 28 g.

8. The method for treating a disease according to claim 6, wherein a total daily administration dosage of the L-serine or the pharmaceutically acceptable salt thereof is from 2 g to 28 g.

9. The method for treating a disease according to claim 5, wherein a total daily administration dosage of the L-serine or the pharmaceutically acceptable salt thereof is 140 mg/kg to 580 mg/kg.

10. The method for treating a disease according to claim 6, wherein a total daily administration dosage of the L-serine or the pharmaceutically acceptable salt thereof is 140 mg/kg to 580 mg/kg.

11. The method for treating a disease according to claim 1, wherein the L-serine or the pharmaceutically acceptable salt thereof is administered to the individual as a syrup formulation.

12. The method for treating a disease according to claim 1, wherein the L-serine or the pharmaceutically acceptable salt thereof is orally administered to the individual.

13. The method for treating a disease according to claim 1, wherein the L-serine or the pharmaceutically acceptable salt thereof is administrable for up to 52 weeks.

14. The method for treating a disease according to claim 5, wherein the L-serine or the pharmaceutically acceptable salt thereof is administrable for up to 52 weeks.

15. The method for treating a disease according to claim 1, wherein the K-VABS-II 2-domain composite (K-VABS-II 2DC) score is improved after administration of L-serine or the pharmaceutically acceptable salt thereof compared to before the administration.

16. The method for treating a disease according to claim 1, wherein the parental distress score of the K-PSI-4-SF (Korean Parenting Stress Index-4th Edition Short Form) is improved after administration of L-serine or the pharmaceutically acceptable salt thereof compared to before the administration.

17. The method for treating a disease according to claim 5, wherein the parental distress score of the K-PSI-4-SF (Korean Parenting Stress Index-4th Edition Short Form) is improved after administration of L-serine or the pharmaceutically acceptable salt thereof compared to before the administration.

18. The method for treating a disease according to claim 1, wherein the L-serine or the pharmaceutically acceptable salt thereof is administered once or twice a day to the individual.

* * * * *